United States Patent
Sun et al.

(10) Patent No.: US 10,985,867 B2
(45) Date of Patent: Apr. 20, 2021

(54) RATE MATCHING RESOURCE SETS FOR WIRELESS SYSTEMS

(71) Applicant: QUALCOMM incorporated, San Diego, CA (US)

(72) Inventors: Jing Sun, San Diego, CA (US); Xiaoxia Zhang, San Diego, CA (US); Ananta Narayanan Thyagarajan, Bangalore (IN); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/418,241

(22) Filed: May 21, 2019

(65) Prior Publication Data

US 2019/0363824 A1 Nov. 28, 2019

(30) Foreign Application Priority Data

May 25, 2018 (IN) .............................. 201841019661

(51) Int. Cl.
*H04W 72/12* (2009.01)
*H04L 1/00* (2006.01)
(Continued)

(52) U.S. Cl.
CPC .......... *H04L 1/0013* (2013.01); *H04L 5/0053* (2013.01); *H04W 72/042* (2013.01);
(Continued)

(58) Field of Classification Search
CPC .......................... H04W 72/1294; H04L 1/0013
See application file for complete search history.

(56) References Cited

U.S. PATENT DOCUMENTS

2010/0002655 A1* 1/2010 Ofuji .................... H04L 5/0053
370/335
2013/0231125 A1* 9/2013 Jeon .................... H04W 72/082
455/452.1
(Continued)

OTHER PUBLICATIONS

Qualcomm Incorporated: "Shortened PDCCH and Data Multiplexing", 3GPP Draft; R1-1704988 Shortened PDCCH and Data Multiplexing, 3rd Generation Partnership Project (3GPP), Mobile Competence Centre; 650, Route Des Lucioles; F-06921 Sophia-Antipolis Cedex; France, vol. Ran WG1, No. Spokane, USA; 20170403-20170407, Apr. 2, 2017 (Apr. 2, 2017), 6 Pages, XP051243119, Retrieved from the Internet: URL: http://www.3gpp.org/ftp/Meetings_3GPP_SYNC/RAN1/Docs/ [retrieved on Apr. 2, 2017].
International Search Report and Written Opinion—PCT/US2019/033436—ISA/EPO—dated Aug. 7, 2019.
(Continued)

*Primary Examiner* — Fahmida S Chowdhury
(74) *Attorney, Agent, or Firm* — Liem T. Do

(57) ABSTRACT

Methods, systems, and devices for wireless communications are described. A wireless device, such as a UE or base station, may identify a rate matching resource set for a transmission time interval (TTI) of a shared channel, where the rate matching resource set includes a set of symbols of the TTI allocated for rate matching. In some cases, the wireless device may identify a rate matching configuration for the rate matching resource set based at least in part on a multi-TTI grant for the shared channel, and perform rate matching of a set of data for transmission via the TTI based on the rate matching resource set and the rate matching configuration. In some cases, the wireless device may transmit, or receive, the rate-matched set of data via the one or more TTIs, in accordance with the multi-TTI grant, based on communications with another wireless device.

30 Claims, 19 Drawing Sheets

(51) Int. Cl.
    H04L 5/00      (2006.01)
    H04W 74/08     (2009.01)
    H04W 76/27     (2018.01)
    H04W 72/04     (2009.01)

(52) U.S. Cl.
    CPC ... *H04W 72/1294* (2013.01); *H04W 74/0833* (2013.01); *H04W 76/27* (2018.02)

(56) References Cited

U.S. PATENT DOCUMENTS

| | | | |
|---|---|---|---|
| 2015/0029903 A1* | 1/2015 | Chen | H04L 1/0078 370/277 |
| 2016/0174194 A1* | 6/2016 | Suzuki | H04L 5/0091 370/312 |
| 2017/0048886 A1* | 2/2017 | Sun | H04W 72/14 |
| 2019/0116007 A1* | 4/2019 | Yi | H04W 56/00 |

OTHER PUBLICATIONS

Nokia et al., "Resource sharing between PDCCH and PDSCH in NR", 3GPP Draft; R1-1710983_Resource sharing between PDCCH and PDSCH_Final, 3rd Generation Partnership Project (3GPP), Mobile Competence Centre, 650, Route Des Lucioles, F-06921 Sophia-Antipolis Cedex, France vol. Ran WG1, No. Qingdao, China; Jun. 27, 2017-Jun. 30, 2017 Jun. 26, 2017, XP051300183, Retrieved from the Internet: URL:http://www.3gpp.org/ftp/Meetings_3GPP_SYNC/RAN1/Docs/ [retrieved on Jun. 26, 2017], 7 pages, section 2.

ZTE et al., "About Dynamic Resource Sharing", 3GPP Draft; R1-1719495 About Dynamic Resource Sharing, 3rd Generation Partnership Project (3GPP), Mobile Competence Centre, 650, Route Des Lucioles, F-06921 Sophia-Antipolis Cedex, France vol. RAN WG1, No. Reno, USA; Nov. 27, 2017-Dec. 1, 2017, Nov. 17, 2017, XP051368803, Retrieved from the Internet: URL:http://www.3gpp.org/ftp/tsg%5Fran/WG1%5FRL1/TSGR1%5F91/Docs/ [retrieved on Nov. 17, 2017], 5 pages.

* cited by examiner

US 10,985,867 B2

RATE MATCHING RESOURCE SETS FOR WIRELESS SYSTEMS

CROSS REFERENCE

The present Application for Patent claims the benefit of India Provisional Patent Application No. 201841019661 by Sun et al., entitled "RATE MATCHING RESOURCE SETS FOR WIRELESS SYSTEMS," filed May 25, 2018, assigned to the assignee hereof, and expressly incorporated herein.

BACKGROUND

The following relates generally to wireless communications, and more specifically to rate matching resource sets for wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal-frequency-division-multiplexing (DFT-S-OFDM). A wireless multiple-access communications system may include a number of base stations or network access nodes, each simultaneously supporting communication for multiple communication devices, which may be otherwise known as user equipment (UE).

In some cases, a transmission opportunity (TxOP), or grant may allow a wireless device to transmit up to a pre-determined TxOP duration, and wait for an acknowledgement (ACK) or a negative acknowledgement (NACK) response before transmitting again. In some cases, the TxOP may vary based on different jurisdictions, Quality of Service (QoS) desired, or other factors. In some aspects, subcarrier spacing (SCS) of a transmission may be flexible, and may vary based in part on the spectrum in use, type of Radio Access Technology (RAT) deployed, etc. Further, a slot length of the transmission may be inversely proportional to the subcarrier spacing. Thus, as the subcarrier spacing increases, the slot length may shrink. In some cases, Hybrid Automatic Repeat Request (HARQ) process resources may be exhausted prior to utilizing an allowed TxOP length. For example, for NR, there may be a maximum of 16 HARQ processes (i.e., a UE may transmit a burst of data up to 16 slots before exhausting HARQ process resources), and transmissions may span only a subset of the allowed TxOP length, which may result in inefficient utilization of resources in a wireless system.

SUMMARY

The described techniques relate to improved methods, systems, devices, and apparatuses that support rate matching resource sets for wireless systems. In some cases, rate matching resource sets may be used for rate matching of multi-slot shared channel transmissions and the allowed rate matching resource sets may be different for the first, intermediate, and last slot of a multi-slot grant, and different for UL and downlink (DL) shared channel transmissions. In some examples, one or more independent bits may be introduced per slot in order to select the rate matching resource set in each slot of the one or more slots subject to the multi-slot grant. Further, to reduce overhead, a select subset of combinations of rate matching resource sets may be allowed across the allocated slots. These bits may be jointly coded with a start and length indicator (SLIV) pattern of the shared channel, a number of slots associated with the transmission opportunity, etc. In some cases, a DL control channel (e.g., Physical DL Control Channel (PDCCH)) monitoring occasion may be rate matched into. Subsequently, the UE may skip PDCCH monitoring. In other cases, the shared channel may be rate matched around the control resource set (CORESET) where the PDCCH arrives. In such cases, the UE may, or may not be expected to monitor PDCCH in the PDCCH monitoring occasions. The PDCCH monitoring occasion may occur within a multi-slot shared channel transmission for that UE.

A method of wireless communications is described. The method may include determining a rate matching resource set for a transmission time interval (TTI) of a shared channel, where the rate matching resource set includes resources of the TTI allocated for rate matching, determining a rate matching configuration for the rate matching resource set, transmitting, to a UE, a multi-TTI grant for communication via the shared channel over multiple TTIs, where the multi-TTI grant includes an indication of the rate matching configuration for the rate matching resource set, performing rate matching of a set of data based on the rate matching resource set and the rate matching configuration, and exchanging the rate matched set of data with the UE via the TTI.

An apparatus for wireless communications is described. The apparatus may include a processor, memory in electronic communication with the processor, and instructions stored in the memory. The instructions may be executable by the processor to cause the apparatus to determine a rate matching resource set for a TTI of a shared channel, where the rate matching resource set includes resources of the TTI allocated for rate matching, determine a rate matching configuration for the rate matching resource set, transmit, to a UE, a multi-TTI grant for communication via the shared channel over multiple TTIs, where the multi-TTI grant includes an indication of the rate matching configuration for the rate matching resource set, perform rate matching of a set of data based on the rate matching resource set and the rate matching configuration, and exchange the rate matched set of data with the UE via the TTI.

Another apparatus for wireless communications is described. The apparatus may include means for determining a rate matching resource set for a TTI of a shared channel, where the rate matching resource set includes resources of the TTI allocated for rate matching, determining a rate matching configuration for the rate matching resource set, transmitting, to a UE, a multi-TTI grant for communication via the shared channel over multiple TTIs, where the multi-TTI grant includes an indication of the rate matching configuration for the rate matching resource set, performing rate matching of a set of data based on the rate matching resource set and the rate matching configuration, and exchanging the rate matched set of data with the UE via the TTI.

A non-transitory computer-readable medium storing code for wireless communications is described. The code may include instructions executable by a processor to determine a rate matching resource set for a TTI of a shared channel, where the rate matching resource set includes resources of the TTI allocated for rate matching, determine a rate matching configuration for the rate matching resource set, transmit, to a UE, a multi-TTI grant for communication via the shared channel over multiple TTIs, where the multi-TTI grant includes an indication of the rate matching configuration for the rate matching resource set, perform rate matching of a set of data based on the rate matching resource set and the rate matching configuration, and exchange the rate matched set of data with the UE via the TTI.

Some examples of the method, apparatuses, and non-transitory computer-readable medium described herein may further include operations, features, means, or instructions for determining a second rate matching resource set for the TTI, where the second rate matching resource set includes second resources of the TTI allocated for rate matching.

Some examples of the method, apparatuses, and non-transitory computer-readable medium described herein may further include operations, features, means, or instructions for determining a second rate matching configuration for the second rate matching resource set and transmitting, to the UE as part of the multi-TTI grant, an indication of the second rate matching configuration for the second rate matching resource set.

In some examples of the method, apparatuses, and non-transitory computer-readable medium described herein, the rate matching resource set may be associated with an initial set of resources of the TTI and the second rate matching resource set may be associated with a last set of resources of the TTI.

In some examples of the method, apparatuses, and non-transitory computer-readable medium described herein, the rate matching resource set includes one or more symbols or resource blocks at a beginning of the TTI and the second rate matching resource set includes one or more symbols or resource blocks at an end of the TTI.

Some examples of the method, apparatuses, and non-transitory computer-readable medium described herein may further include operations, features, means, or instructions for transmitting, to the UE as part of the rate matching configuration, a rate matching indicator for the rate matching resource set and the second rate matching resource set, where the rate matching indicator indicates whether to rate match around the resources of the TTI or rate match into the resources of the TTI for each TTI of the multi-TTI grant.

In some examples of the method, apparatuses, and non-transitory computer-readable medium described herein, transmitting the rate matching indicator may include operations, features, means, or instructions for transmitting the rate matching indicator for each TTI of the multi-TTI grant, where each rate matching indicator includes a set of two or more bits indicating the rate matching configuration for the rate matching resource set and the second rate matching resource set for each TTI of the multi-TTI grant.

Some examples of the method, apparatuses, and non-transitory computer-readable medium described herein may further include operations, features, means, or instructions for transmitting, to the UE, a start and length indicator value that conveys a starting symbol, an ending symbol, and a number of TTIs for the multi-TTI grant.

Some examples of the method, apparatuses, and non-transitory computer-readable medium described herein may further include operations, features, means, or instructions for configuring the UE to determine the rate matching resource set based on the starting symbol, the ending symbol, the number of TTIs for the multi-TTI grant, or a combination thereof.

In some examples of the method, apparatuses, and non-transitory computer-readable medium described herein, the start and length indicator value may be transmitted via DL control information (DCI).

In some examples of the method, apparatuses, and non-transitory computer-readable medium described herein, performing rate matching may include operations, features, means, or instructions for performing rate matching of the shared channel based on the rate matching configuration, where rate matching may be performed around or into the resources of the TTI configured for a physical random access channel (PRACH), a physical UL control channel (PUCCH), a physical broadcast channel (PBCH), a synchronization signal, a reference signal, a PDCCH, a clear channel access (CCA) gap, or any combination thereof.

Some examples of the method, apparatuses, and non-transitory computer-readable medium described herein may further include operations, features, means, or instructions for transmitting, to the UE via Radio Resource Control (RRC) signaling, an indication of the rate matching resource set.

In some examples of the method, apparatuses, and non-transitory computer-readable medium described herein, exchanging the rate matched set of data may include operations, features, means, or instructions for transmitting the rate matched set of data via a physical DL shared channel (PDSCH).

In some examples of the method, apparatuses, and non-transitory computer-readable medium described herein, exchanging the rate matched set of data may include operations, features, means, or instructions for receiving the rate matched set of data via a physical UL shared channel (PUSCH).

A method of wireless communications is described. The method may include identifying a rate matching resource set for a TTI of a shared channel, where the rate matching resource set includes resources of the TTI allocated for rate matching, receiving, from a base station, a multi-TTI grant for communication via the shared channel over multiple TTIs, where the multi-TTI grant includes an indication of a rate matching configuration for the rate matching resource set, performing rate matching of a set of data based on the rate matching resource set and the rate matching configuration, and exchanging the rate matched set of data with the base station via the TTI.

An apparatus for wireless communications is described. The apparatus may include a processor, memory in electronic communication with the processor, and instructions stored in the memory. The instructions may be executable by the processor to cause the apparatus to identify a rate matching resource set for a TTI of a shared channel, where the rate matching resource set includes resources of the TTI allocated for rate matching, receive, from a base station, a multi-TTI grant for communication via the shared channel over multiple TTIs, where the multi-TTI grant includes an indication of a rate matching configuration for the rate matching resource set, perform rate matching of a set of data based on the rate matching resource set and the rate matching configuration, and exchange the rate matched set of data with the base station via the TTI.

Another apparatus for wireless communications is described. The apparatus may include means for identifying a rate matching resource set for a TTI of a shared channel, where the rate matching resource set includes resources of the TTI allocated for rate matching, receiving, from a base station, a multi-TTI grant for communication via the shared channel over multiple TTIs, where the multi-TTI grant includes an indication of a rate matching configuration for the rate matching resource set, performing rate matching of a set of data based on the rate matching resource set and the rate matching configuration, and exchanging the rate matched set of data with the base station via the TTI.

A non-transitory computer-readable medium storing code for wireless communications is described. The code may include instructions executable by a processor to identify a rate matching resource set for a TTI of a shared channel, where the rate matching resource set includes resources of the TTI allocated for rate matching, receive, from a base station, a multi-TTI grant for communication via the shared channel over multiple TTIs, where the multi-TTI grant includes an indication of a rate matching configuration for the rate matching resource set, perform rate matching of a set of data based on the rate matching resource set and the rate matching configuration, and exchange the rate matched set of data with the base station via the TTI.

In some examples of the method, apparatuses, and non-transitory computer-readable medium described herein, identifying the rate matching resource set may include operations, features, means, or instructions for determining the rate matching resource set based on the multi-TTI grant.

In some examples of the method, apparatuses, and non-transitory computer-readable medium described herein, identifying the rate matching resource set may include operations, features, means, or instructions for receiving, from the base station via RRC signaling, an indication of the rate matching resource set.

Some examples of the method, apparatuses, and non-transitory computer-readable medium described herein may further include operations, features, means, or instructions for identifying a second rate matching resource set for the TTI, where the second rate matching resource set includes second resources of the TTI allocated for rate matching.

Some examples of the method, apparatuses, and non-transitory computer-readable medium described herein may further include operations, features, means, or instructions for receiving, from the base station as part of the multi-TTI grant, an indication of a second rate matching configuration for the second rate matching resource set.

In some examples of the method, apparatuses, and non-transitory computer-readable medium described herein, the rate matching resource set may be associated with an initial set of resources of the TTI and the second rate matching resource set may be associated with a last set of resources of the TTI.

In some examples of the method, apparatuses, and non-transitory computer-readable medium described herein, the rate matching resource set includes one or more symbols or resource blocks at a beginning of the TTI and the second rate matching resource set includes one or more symbols or resource blocks at an end of the TTI.

Some examples of the method, apparatuses, and non-transitory computer-readable medium described herein may further include operations, features, means, or instructions for receiving, from the base station as part of the rate matching configuration, a rate matching indicator for the rate matching resource set, where the rate matching indicator indicates whether to rate match around the resources of the TTI or rate match into the resources of the TTI for each TTI of the multi-TTI grant.

In some examples of the method, apparatuses, and non-transitory computer-readable medium described herein, receiving the rate matching indicator may include operations, features, means, or instructions for receiving the rate matching indicator for each TTI of the multi-TTI grant, where each rate matching indicator includes a set of two or more bits indicating the rate matching configuration for the rate matching resource set and the second rate matching resource set for each TTI of the multi-TTI grant.

Some examples of the method, apparatuses, and non-transitory computer-readable medium described herein may further include operations, features, means, or instructions for receiving, from the base station, a start and length indicator value that conveys a starting symbol, an ending symbol, and a number of TTIs for the multi-TTI grant.

Some examples of the method, apparatuses, and non-transitory computer-readable medium described herein may further include operations, features, means, or instructions for determining the rate matching resource set based on the starting symbol, the ending symbol, the number of TTIs for the multi-TTI grant, or a combination thereof.

In some examples of the method, apparatuses, and non-transitory computer-readable medium described herein, the start and length indicator value may be received via DCI.

In some examples of the method, apparatuses, and non-transitory computer-readable medium described herein, performing rate matching may include operations, features, means, or instructions for performing rate matching of the shared channel based on the rate matching configuration, where rate matching may be performed around or into the resources of the TTI configured for a PRACH, a PUCCH, a PBCH, a synchronization signal, a reference signal, a PDCCH, a CCA gap, or any combination thereof.

In some examples of the method, apparatuses, and non-transitory computer-readable medium described herein, exchanging the rate matched set of data may include operations, features, means, or instructions for receiving the set of data via the TTI rate matched around a PDCCH and refraining from monitoring a PDCCH occasion in a subsequent TTI. In some other examples of the method, apparatuses, and non-transitory computer-readable medium described herein, exchanging the rate matched set of data may include operations, features, means, or instructions for receiving the set of data via the TTI rate matched around a PDCCH and monitoring a PDCCH occasion in the same, or a subsequent TTI.

Some examples of the method, apparatuses, and non-transitory computer-readable medium described herein may further include operations, features, means, or instructions for receiving, from the base station via RRC signaling, an indication of the rate matching resource set.

In some examples of the method, apparatuses, and non-transitory computer-readable medium described herein, exchanging the rate matched set of data may include operations, features, means, or instructions for receiving the rate matched set of data via a PDSCH.

In some examples of the method, apparatuses, and non-transitory computer-readable medium described herein, exchanging the rate matched set of data may include operations, features, means, or instructions for transmitting the rate matched set of data via a PUSCH.

DETAILED DESCRIPTION

Figure 1:
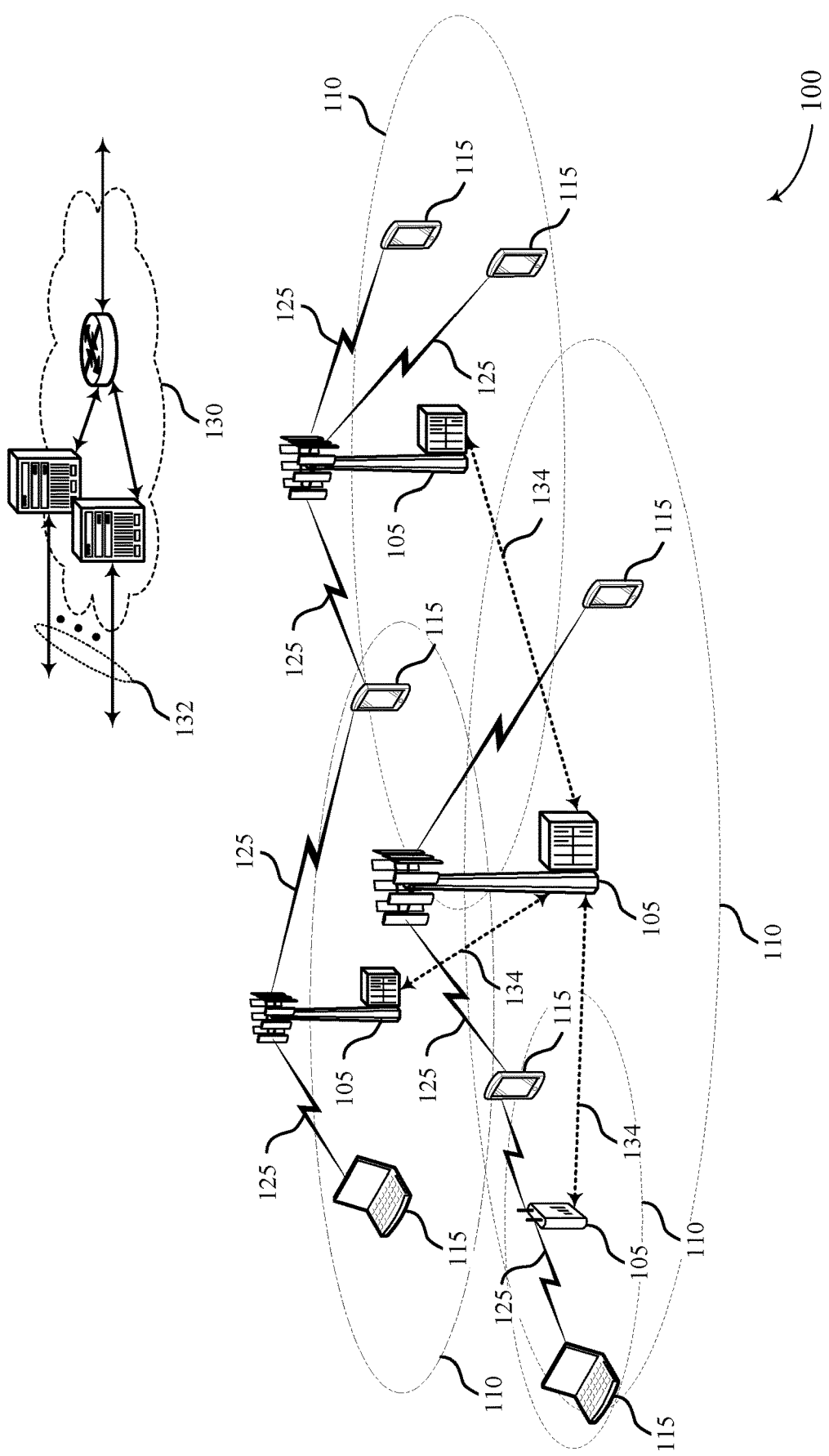
FIGS. 1 and 2 illustrate examples of wireless communications systems that support rate matching resource sets for wireless systems in accordance with aspects of the present disclosure.

In some wireless communications systems, such as those operating in New Radio (NR), a base station may signal an UL (or DL) transmission opportunity (TxOP), or grant to a user equipment (UE). In some cases, the UE may utilize the grant to transmit (or receive) one or more transport blocks (TBs) over a transmission time interval (TTI) of a shared channel. In some cases, such as for NR, grants or TxOPs in unlicensed spectrum may be up to 10 milliseconds (ms) in length. In some aspects, the length of the grants may be based in part on regulations, Quality of Service (QoS) desired, etc. In some cases, the slot length may be inversely proportional to the subcarrier spacing. Thus, as the subcarrier spacing increases, the slot length may shrink.

In some cases, utilization of the TxOP length may be limited due to one or more factors, such as the number of Hybrid Automatic Repeat Request (HARQ) processes that may be supported. In one example, up to 16 HARQ processes may be supported by a UE in NR. In some cases, for the same UE, the longest TxOP may be 16 slots before the HARQ process resource is exhausted. For a 120 kHz subcarrier spacing, each slot may be 0.125 ms in length, and the total TxOP may be limited to 2 ms. Similarly, for a 960 kHz subcarrier spacing, each slot may be 0.015625 ms in length, and 16 slots may span 0.25 ms. In such cases, a substantial portion of the TxOP may be left unutilized. While the base station may be able to extend the TxOP length by multiplexing transmissions for different UEs, the base station may be limited to utilizing the same beam. In some cases, such as while operating in mmW spectrum, it may be difficult for a base station to find UEs in the same beam for a TxOP, due to line of sight (LOS) requirements, and/or shorter ranges for mmW communications.

In some examples, one or more different techniques may be deployed in order to efficiently utilize longer grants or transmission opportunities. For instance, dynamic slot aggregation may be used to transmit data, either UL or DL, over multiple slots. In such cases, a flexible TB may be configured for transmission of data over one or more slots. In some other cases, a long TTI may be used continuously across multiple slots. In some cases, the technique may be code block group transmission indication (CBGTI) based. In some cases, rate matching resource sets may be identified for one or more TTIs subject to the multi-TTI (or multi-slot TTI) grant. Further, the rate matching resource sets may comprise a set of symbols of their respective TTIs allocated for rate matching.

In some cases, long TTIs across multiple slots may allow for efficient utilization of resources due to lack of DL and/or UL control segments. In some cases, however, dynamic slot aggregation may provide for added flexibility since DL and/or UL control may be transmitted on a different beam for a different UE in the time durations where a shared channel (e.g., Physical DL Shared Channel (PDSCH)) is not rate matched. Thus, a flexible scheme supporting both dynamic slot aggregation, and long TTI based transmissions may be desired.

In some cases, one or more rate matching resource sets may be configured to support multi-slot DL and/or UL grants via dynamic reuse of resources allocated for control segments. In some cases, one or more indicator bits introduced in the multi-slot grant may be used for configuring rate matching resource sets. In some cases, rate matching may comprise matching the number of bits in a TB to the total number of bits that may be transmitted in a given TxOP. In some examples, rate matching may involve sub-block interleaving, bit collection, pruning, etc. In some cases, a shared channel TB may be segmented into one or more code blocks (CBs). Further, rate matching may be performed over CBs, for instance, after the CBs have undergone encoding (e.g., turbo encoding). In some cases, rate matching may create an output bit stream with a desired code rate. In some cases, the encoded TB may further undergo scrambling, modulation, layer mapping, and precoding and resource mapping, prior to transmission.

In some cases, resource element mapping for transmission of the shared channel may comprise mapping a block of complex valued symbols associated with the shared channel, in sequence, to resource elements not occupied by synchronization and reference signals, control channels, random access channels, etc. In some aspects, a rate matching resource set may be defined and configured using a bitmap in time and frequency domain, and the shared channel may be rate matched around the rate matching resource set (i.e., by excluding the resources defined by the rate matching resource set). For instance, a UE may be configured using Radio Resource Control (RRC) signaling, or DL control information (DCI), with one or more rate matching resource sets. In such cases, the UE may assume that a scheduled PDSCH may be rate matched around (i.e., excluding) and/or into (i.e., including) the rate matching resource set.

In some cases, one or more rate matching resource sets may be defined for rate matching of multi-slot physical UL shared channel (PUSCH) and/or PDSCH. In some examples, the allowed rate matching resource sets may be different for the first, intermediate, and last slot of a multi-slot grant, and different for PDSCH and PUSCH. In some cases, one or more independent bits may be introduced per slot, which may be used to configure the rate matching resource set in each slot of the one or more slots in the multi-slot grant.

Further, to reduce overhead, only certain subsets of combinations of rate matching resource sets across all the allocated slots may be allowed. In some cases, these bits may be jointly coded with a start and length indicator (SLIV) pattern for the shared channel, number of slots spanned by the flexible TB, etc. to further reduce overhead, and optimize UE performance.

In some cases, DL/UL multi-slot transmissions may be rate matched around DL and/or UL control segments indicated via one or more rate matching resource sets. In some cases, a rate matching resource set may be controlled by a bit in the DCI, where the bit dynamically indicates a configuration for the rate matching resource set. For instance, the bit may be used to indicate if a shared channel, such as PDSCH, is rate matched into, or around the resource set. In some examples, if the PDSCH is rate matched into the resource set, the control channel elements (CCEs) where a DL grant (or DCI) is received may be rate matched around. In some other cases, a DL control channel (e.g., Physical DL Control Channel (PDCCH)) monitoring occasion may be rate matched into. In such cases, the UE may skip monitoring the PDCCH. In some examples, wireless communications systems, such as those deploying NR, may support symbol-resource block level rate matching resource sets for shared channel rate matching. In such cases, PDSCH may be rate matched around a control resource set (CORESET) carved in the rate matching resource set, thus enabling PDCCH monitoring at the UE.

Aspects of the disclosure are initially described in the context of a wireless communications system. Aspects of the disclosure are further illustrated by and described with reference to wireless communications messages, rate matching configurations, process flows, apparatus diagrams, system diagrams, and flowcharts that relate to rate matching resource sets for wireless systems.

FIG. 1 illustrates an example of a wireless communications system 100 that supports rate matching resource sets for wireless systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include UL transmissions from a UE 115 to a base station 105, or DL transmissions from a base station 105 to a UE 115. DL transmissions may also be called forward link transmissions while UL transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include DL transmissions, UL transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases, perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period ($T_s$). In one example, and for a bandwidth of 20 MHz, and a subcarrier carrier spacing of 15 kHz, the sampling period ($T_s$) may be 1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes (or slots) numbered from 0 to 9, and each subframe (or slot) may have a duration of 1 ms. In some cases, a subframe may be further divided into 2 slots each having a duration of 0.5 ms, and each slot may contain 6 or 7 modulation symbol periods (e.g., depending on the length of the cyclic prefix prepended to each symbol period). In another example, a slot may contain 14 modulation symbol periods. Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved-Universal Terrestrial Radio Access (E-UTRA) absolute radio frequency channel number (EARFCN)), and may be positioned according to a channel raster for discovery by UEs 115. Carriers may be DL or UL (e.g., in an FDD mode), or be configured to carry DL and UL communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a DL carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple DL component carriers and one or more UL component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a wireless device such as a UE 115 or base station 105 may use one or more techniques to efficiently utilize longer grants or TxOPs. For instance, dynamic slot aggregation may be used to transmit data, either UL or DL, over multiple slots (or TTIs). In such cases, a flexible TB may be configured for transmission of data over one or more slots. In some other cases, a long TTI may be used continuously across multiple slots. In some cases, long TTIs across multiple slots may allow for efficient utilization of resources due to lack of control segments. In some cases, however, dynamic slot aggregation may provide for added flexibility. For instance, DL and/or UL control may be transmitted on a different beam for a different UE 115 in the time durations where a shared channel is not rate matched. Thus, a flexible scheme supporting both dynamic slot aggregation, and long TTI based transmissions may be desired.

In some cases, one or more rate matching resource sets may be configured by the base station 105 to support dynamic reuse of resources allocated for DL and/or UL control segments, in order to support multi-slot DL and/or UL grants. In some examples, rate matching resource sets may be indicated via DCI, RRC signaling, or any other types of DL signaling from the base station 105. In some cases, continuous DL/UL multi-slot transmissions may be supported by rate matching into control segments. In some other cases, DL/UL multi-slot transmissions may be rate matched around DL and/or UL control segments.

In some cases, symbol-RB level rate matching resource sets may be supported for shared channel (e.g., PDSCH) rate matching. In some aspects, a rate matching resource set may be defined and configured using a bitmap in time and frequency domain, and the PDSCH may be rate matched around it. Further, a configured rate matching resource set may be controlled by a bit in DCI, where the bit dynamically indicates if the PDSCH is rate matched into the resource set. In some examples, if the PDSCH is rate matched into the resource set, the CCEs where the DL grant (or DCI) is received may be rate matched around. Thus, the UE 115, the base station 105, and/or other devices may use one or more techniques described in accordance with various aspects of the present disclosure to coordinate use of rate matching resource sets for multi-TTI grants to facilitate more efficient and effective use of long transmission opportunities.

Figure 2:
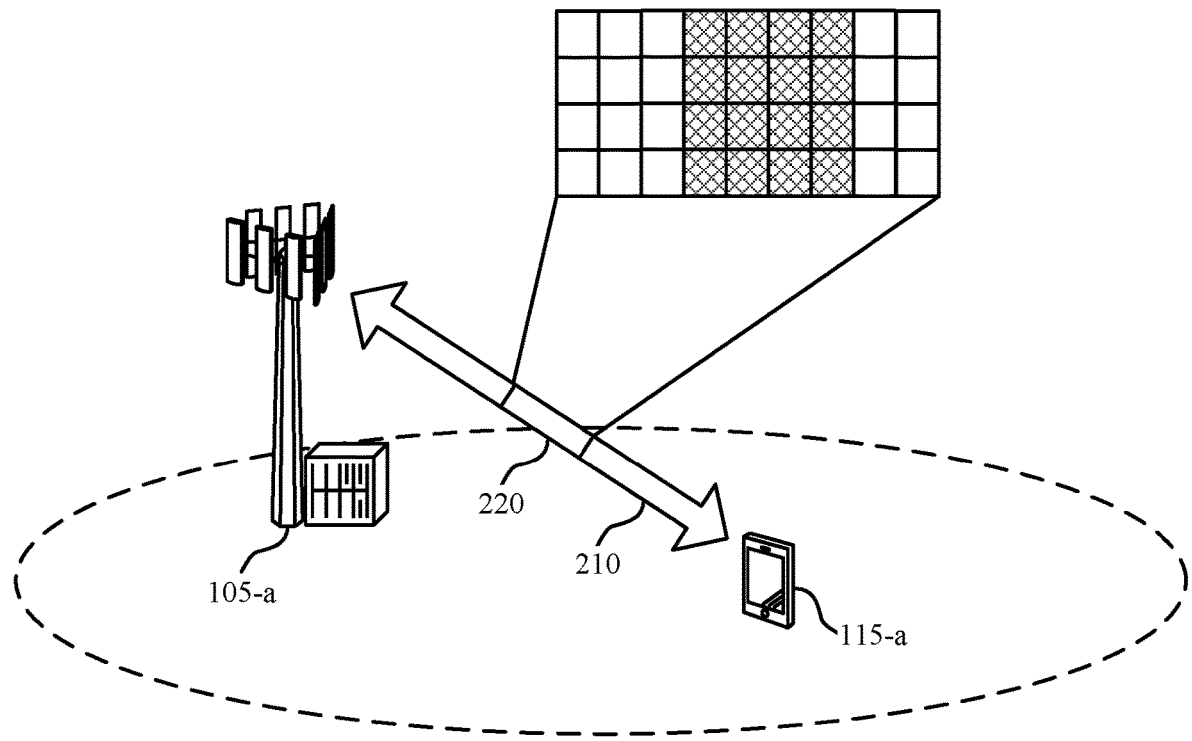

FIG. 2 illustrates an example of a wireless communications system 200 that supports rate matching resource sets for multi-TTI grants in accordance with aspects of the present disclosure. In some examples, wireless communications system 200 may implement aspects of wireless communication system 100. The wireless communications system 200 may include UE 115-a and a base station 105-a, which may be examples of the UE 115 and base station 105 described with reference to FIG. 1. As shown, UE 115-a may communicate with base station 105-a via communication link 210. In some examples, wireless communications system 200 may be an example of a wireless communications system deploying NR, or operating in mmW spectrum. Further, wireless communications system 200 may operate in licensed or unlicensed spectrum.

In some cases, wireless communications system 200 may support long transmission opportunities (e.g., up to 10 ms). Further, the allowed transmission opportunities may be substantially longer than the slot length used for the transmissions. In some cases, the length of the TxOP may be based in part on jurisdictional regulations, or desired Quality of Service (QoS). As previously described, in some cases, the slot length may be inversely proportional to the subcarrier spacing. Thus, as the subcarrier spacing increases, the slot length may decrease. In some cases, the number of HARQ processes supported may be fixed for a particular RAT. For instance, up to 16 HARQ processes may be supported in NR. In some cases, the longest grant for UE 215 before the HARQ process resource is exhausted may be 16 slots, limiting the TxOP length. For instance, for a 120 kHz subcarrier spacing, each slot may be 0.125 ms. Thus, the total TxOP may be limited to 2 ms. Similarly, for a 960 kHz subcarrier spacing, each slot may be 0.015625 ms in length, and 16 slots may be 0.25 ms. In such cases, the entire TxOP (e.g., 10 ms) may not be utilized, since it may be limited to 0.25 ms (e.g., prior to the utilization of all 16 HARQ process resources). In some cases, while the base station 105-a may be able to extend the TxOP length by multiplexing transmissions for different UEs 115, the base station 105-a may need to utilize the same beam for the different UEs 115, based in part on one or more factors. For instance, the base station 205 may find it difficult to locate multiple UEs in the same beam for a TxOP, due to line of sight (LOS) requirements, and/or shorter range for mmW communications.

In some cases, one or more different techniques may be deployed in order to efficiently utilize longer grants or transmission opportunities. For instance, dynamic slot aggregation may be used to transmit data, either UL or DL, over multiple slots. In such cases, a flexible TB may be configured for transmission of data over one or more slots. In some other cases, a long TTI may be used continuously across multiple slots. As previously described, long TTIs across multiple slots may allow for efficient utilization of resources due to lack of DL and/or UL control segments. In some cases, however, dynamic slot aggregation may provide for added flexibility. Thus, a flexible scheme supporting both dynamic slot aggregation, and long TTI based transmissions may be desired.

In some cases, a shared channel TB may be segmented into one or more code blocks (CBs) before being passed to the channel coding and rate matching modules. Further, in some cases, one or more CBs may be grouped into code block groups (CBGs). In some cases, the code blocks output after rate matching may be concatenated to form CBGs. In some cases, the CBGs may be concatenated or combined to recover the entire TB. In some cases, base station 105-a may transmit a signaling message, such as a PDCCH, which may include an indication of which code block groups (CBGs) are included in one or more upcoming transmissions (e.g., PDSCH). In some cases, instead of transmitting all of the allocated CBGs in a new transmission, the transmitted signaling message may indicate a subset of CBGs to be transmitted in one slot (e.g., slot 220). As such, a TB may be transmitted over multiple slots. The signaling message may also include an indicator for the receiver to send back ACK/NACKs for the CBGs received.

In some aspects, the term flexible TB may refer to a TB that may spread over more than one slot within a TxOP while the TB size is fixed (e.g., as agreed upon in a technical specification from a standards body). Thus, the TB may be flexible in terms of the number of CBGs that can be transmitted in a TxOP, and the number of slots over which the CBGs may be transmitted within the TxOP. Broadly, the flexible TB may be based on a standard TB, with the added flexibility to carry more CBGs for a given TxOP.

In some cases, base station 105-a may configure UE 115-a with a control resource set (CORESET) containing search spaces for transmission of control information (e.g., DCI) to a UE on the PDCCH. In some cases, the DCI obtained within the CORESET and a search space may be used to indicate the resources on which certain types of system information may be received over a DL shared channel (e.g., PDSCH). In some cases, the UE 115-a may determine the information related to the flexible TB, for instance, which subset of the CBGs to expect in upcoming transmissions for the current TxOP. Further, in some cases, the receiving UE 115-a may also determine the HARQ process ID, ACK/NACK resource allocation for the transmission, whether the expected transmission is a new transmission, or a retransmission.

In some cases, the base station 105-a may configure UE 115-a with one or more rate matching resource sets 230 to support multi-slot DL and/or UL grants, by dynamically reusing resources allocated for DL and/or UL control segments (i.e., for carrying PDCCH and/or physical UL control channel (PUCCH)). For instance, in some cases, continuous DL/UL multi-slot transmissions may be supported by rate matching into control segments. In some other cases, multi-slot transmissions for DL and/or UL may be supported by rate matching around DL and/or UL control segments. A rate matching resource set may comprise a set of resources in time-frequency domain (e.g., symbols, resource blocks) around, and/or into which a scheduled PDSCH may be rate matched.

In some cases, rate matching may be performed in order to extract the exact set of bits to be transmitted within a time duration, such as a TTI, for example. In some cases, rate matching may comprise matching the number of bits in a TB to the total number of bits that may be transmitted in a given allocation. In some examples, rate matching may involve sub-block interleaving, bit collection, pruning, etc. In some cases, the PDSCH TB may be segmented into one or more CBs. Further, rate matching may be performed over CBs, for instance, after the CBs have undergone encoding (e.g., turbo encoding). In some cases, rate matching may create an output bit stream with a desired code rate. In some cases, the encoded TB may further undergo scrambling, modulation, layer mapping, and precoding and resource mapping, prior to transmission. In some cases, resource element mapping for transmission of the PDSCH may comprise mapping a block of complex valued symbols associated with the PDSCH, in sequence, to resource elements not occupied by synchronization and reference signals, a physical random access channel (PRACH), control channels, clear channel access (CCA) gaps, etc.

In some cases, wireless communications systems, such as those deploying NR, may support symbol-RB level rate matching resource sets for shared channel (e.g., PDSCH) rate matching. That is, a rate matching resource set may comprise a subset of the bandwidth spanned by the PDSCH. In some aspects, a rate matching resource set 230 may be defined and configured using a bitmap in time and frequency domain, and the PDSCH may be rate matched around it, as illustrated by PDSCH rate matching region 225. For instance, the UE 115-a may be configured using RRC signaling, or DCI, with one or more rate matching resource sets 230. In such cases, the UE 115-a may assume that a scheduled PDSCH may be rate matched around and/or into the resource set. In some examples, a configured rate matching resource set may be controlled by a bit (e.g., a rate matching indicator) in the DL grant or DCI, where the bit dynamically indicates if the PDSCH is rate matched into the resource set. In some examples, if the PDSCH is rate matched into the resource set, the CCEs where the DL grant (or DCI) is present may be rate matched around. In such cases, the UE 115-a may skip PDCCH monitoring.

In some cases, a resource allocation pattern for a shared channel may be configured and signaled as an SLIV pattern, and indicated via DCI. In some cases, the SLIV pattern may assist the UE 115-a in determining the time or frequency resources over which the DL data may be received. In some cases, when configuring an SLIV pattern for PDSCH, or PUSCH, the DCI may configure, for the flexible TB, a starting symbol (A), an ending symbol (B), and a number of slots (S) spanned by the flexible TB. Further, the configuration information (e.g., A, B, and S) may be jointly encoded, and dynamically selected for the DL and/or UL grant. In some aspects, the granted PDSCH may potentially cover all S slots except the first A symbols in the first slot, and last B symbols in the last slot.

In some cases, and as further described with reference to FIG. 4, the DCI may be used to define a rate matching resource set C for each slot spanned by the flexible TB. Further, the rate matching resource set C may comprise one or more resources (e.g., symbols, RBs) in each slot. Additionally, a different rate matching resource set D including one or more resources in each slot, may be indicated by the DCI. It should be noted that the rate matching resource sets C and D may be defined for all slots except the first slot and last slot, which may be configured using A and B instead. In some other cases, D may be defined for the first slot, and C may be defined for the last slot. In some cases, the UE 115-a may receive a rate matching configuration from the base station 105-a. For example, two or more bits may be used in the DCI for purposes of rate matching control. In some cases, a first bit (e.g., X) and a second bit (e.g., Y) may be used to control rate matching into, or rate matching around for the rate matching resource sets C and D in each slot of the one or more slots, respectively. For instance, for each bit, one value may be used to indicate rate matching around, while another different value may be used to indicate rate matching into.

In some cases, rate matching may be supported for both DL (e.g., for PDSCH), as well as for UL (e.g., for PUSCH). In some aspects, one or more bits associated with rate matching may be utilized in both DL and UL grants. In some cases, when a configured PDCCH monitoring occasion is indicated for rate matching into, PDCCH monitoring may not be performed. In some other cases, when a configured PDCCH monitoring occasion is indicated for rate matching around, UE 115-a may or may not perform PDCCH monitoring, for instance, based on RRC signaling, or any other type of signaling.

In some cases, a rate matching resource set definition for multi-slot PDSCH and multi-slot PUSCH may be different. For instance, different C and D definitions may be applied to PDSCH and PUSCH. In some cases, C and/or D may comprise only a subset of RBs spanned by the channel. In some cases, C and D may be deployed to cover LBT gaps. In some examples, for multi-slot PUSCH, C and D may be defined at a symbol level. In some other examples, for multi-slot PDSCH, C may be symbol-RB level, which may allow only the CORESET to be carved out. In such cases, the CORESET may span only a subset of subcarriers spanning the entire channel bandwidth. Thus, in some cases, a CORESET may be surrounded on both sides in the frequency domain by the rate matched PDSCH.

In some cases, such as for UL (e.g., rate matching for PUSCH), the entire first symbol may be left blank or unused, for receiving PDCCH. Further, one or more gaps may be left for LBT procedures, for example, if operating in unlicensed spectrum. In some other cases, such as for DL, only a part of the symbol may be left blank. In such cases, if PDCCH needs to be sent, a portion of the first symbol may be available, whereas if there is no PDCCH, the symbol may not be left blank. In some cases, the last symbol of a slot may be left blank for UL control between DL slots. In some other cases, only a portion of the last symbol of a slot may be left blank for UL control, for example, between UL slots.

In some cases, UE 115-a or base station 105-a may rate match around other resources that are not part of the rate matching resource set, based in part on information obtained in DCI, system information (SI), RRC configurations, etc. For example, in some cases, rate matching may be performed around reserved PRACH and/or PUCCH resources in UL, or around one or more resources for synchronization signals, a physical broadcast channel (PBCH), CSI-RS, TRS, etc. in DL. In some cases, rate matching may be performed around a clear channel access (CCA) gap.

In some cases, a configured UL rate matching resource set may include one or more associated LBT parameters. For instance, a one (1) bit parameter may be used to specify whether the UE 115-a is required to perform LBT before resuming transmission after a rate matching gap. In some cases, such an indication may serve to optimize power performance at the UE 115-a.

In some cases, rate matching resource sets may not be configured separately for DL and UL. For instance, a UE may be configured to determine C and D based on A and B. As one example, if A includes some set of resources in an initial portion of a slot, then the UE may be configured to treat the like resources in a subsequent slot as including an associated rate matching resource set (e.g., C). Similarly, if B includes some set of resources in an end portion of a slot, then the UE may be configured to treat the like resources in a subsequent slot as including an associated rate matching resource set (e.g., D). Thus, C and D may be defined independent of A and B, or the UE may be configured to leverage the information in the SLIV to determine the resources included in C or D. Thus, by dynamically configuring (e.g., via DCI, such as via the multi-TTI grant) the SLIV, the base station may also dynamically configure one or more rate matching resource sets associated with the SLIV. Further, the resources used to indicate the rate matching resource set C may be associated with A, while the resources used to indicate the rate matching resource set Y may be associated with B. In some cases, A and B may be dynamic, while C and D are semi-static. In some examples, rate matching resource sets C or D may be dynamically configured by changing A and/or B. For instance, if A indicates a starting symbol 2, rate matching resource set C may also span two (2) symbols in the time domain, and one or more RBs in the frequency domain.

In some cases, a higher resolution rate matching indicator (i.e., including added bits) may be included in the grant. For instance, instead of utilizing a single bit for indicating rate matching configuration, additional bits may be used for finer control. In one example, two (2) bits may be used for rate matching indicators X and Y, respectively, and different combinations of the bits may be used to indicate a certain subset of C or D regions, respectively, to be rate matched around or rate matched into. For instance, if X has bit values of 00, it may indicate that all C regions should be rate matched around, while a 11 may indicate that all C regions should be rate matched into. In some examples, if X has bit values of 01, it may indicate that every other C resource set is rate matched around, while a 10 may indicate that every 1 out of 4 C resource sets are rate matched around.

If Y has bit values of 00, it may indicate that all D regions should be rate matched around, while a 11 may indicate that all D regions should be rate matched into. In some examples, if Y has bit values of 01, it may indicate that every other D resource set is rate matched around, while a 10 may indicate that every 1 out of 4 D resource sets are rate matched around.

Introducing additional bits in the DCI for rate matching may enable finer control between PDSCH resources and control resources. In some cases, the configuration of the rate matching indicator may depend on the number of slots in the multi-slot TTI, and may be associated with the SLIV configuration for the shared channel of the multi-slot TTI.

Figure 3:
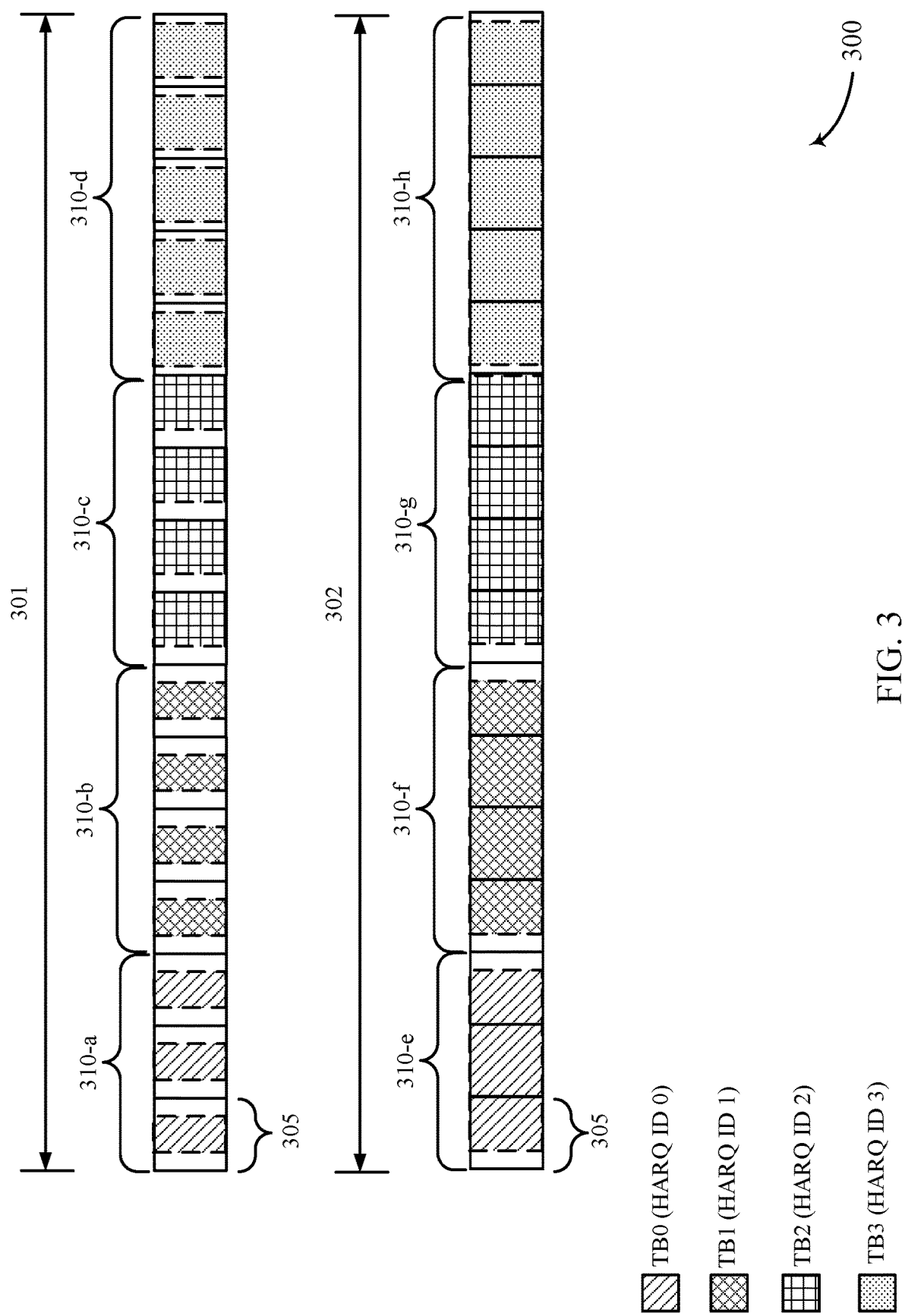
FIG. 3 illustrates examples of wireless communications messages that support rate matching resource sets for wireless systems in accordance with aspects of the present disclosure.

FIG. 3 illustrates examples of wireless communications messages 301 and 302 that support rate matching resource sets for wireless systems in accordance with aspects of the present disclosure. In some examples, wireless communications messages 301 and 302 may implement aspects of wireless communications systems 100 and/or 200. In some cases, the wireless communications messages 301 and 302 may be transmitted over one or more slots 305. In some cases, the slots 305 may be divided into one or more time increments (e.g., OFDM symbols).

Wireless communications message 301 may illustrate an example of dynamic slot aggregation for multi-slot transmissions. In some cases, a UE 115 may receive a DCI message conveying an SLIV pattern for the one or more slots. In some cases, the SLIV pattern for a slot 305 may be implicitly derived from the SLIV pattern for a preceding slot. In some cases, the SLIV pattern received by the UE 115 may comprise at least, an indication of a starting symbol, an ending symbol, and an aggregation level (i.e., number of slots the pattern, and DCI HARQ ID is valid for). Thus, one or more slots 305 may be aggregated to form an aggregation 310 (e.g., aggregation 310-a, aggregation 310-b, aggregation 310-c, and aggregation 310-d). In some cases, each aggregation 310 may carry a transport block, such as TB0, TB1, TB2, and TB3.

In some cases, the UE 115 may determine information related to the multi-slot grant (e.g., slot aggregation based grant) from the DCI, and one or more configured rate matching resource sets. As illustrated, the UE 115 may determine that TB0 carried over aggregation 310-a (aggregation level of 3) is associated with HARQ process ID 0, and starting symbol #2 and ending symbol #11. Similarly, TB1 carried over aggregation 310-b (aggregation level of 4) includes a HARQ process ID 1, and a starting point symbol #2 and ending symbol #9. Lastly, information pertaining to TB2, and TB3 carried over aggregations 310-c and 310-d, respectively, may also be associated with a HARQ process ID, and start-end symbols.

In some cases, wireless communications message 302 may illustrate a long or extended TTI (i.e., continuous across multiple slots) in accordance with one or more aspects of the present disclosure. In some cases, the configuration of an extended slot may be accomplished through a signaling message, such as RRC, or DCI from a base station 105 to a UE 115. In some cases, the DCI may include an indication of a starting symbol, and an ending symbol for the extended slot. In some cases, the extended slot may accommodate a flexible TB with multiple CBGs that may extend over a regular slot.

In some cases, the DCI field of the signaling message may include a HARQ process ID, a starting symbol, and an ending symbol of the extended slot (or aggregation). For example, for aggregation 310-e, the DCI field may include a HARQ process ID 0, a starting symbol #2 of a current slot 305 (e.g., Slot 0), and an ending symbol #11 of current slot+2 (e.g., Slot 2). Similarly, the DCI fields for aggregations 310-b, 310-c, and 310-d may include similar information.

In some cases, resource element mapping for transmission of the PDSCH may comprise mapping a block of complex valued symbols associated with the PDSCH, in sequence, to resource elements not occupied by synchronization and reference signals, PBCH, Physical Hybrid-ARQ Indicator Channel (PHICH), etc. In some cases, wireless communications systems, such as those deploying NR, may support symbol-RB level rate matching resource sets for DL shared channel (e.g., PDSCH) rate matching. That is, a rate matching resource set may comprise a subset of the bandwidth spanned by the PDSCH. In some aspects, a rate matching resource set may be defined and configured using a bitmap in time and frequency domain, and the PDSCH may be rate matched around it. For instance, the UE 115 may be configured using RRC signaling, or DCI, with one or more rate matching resource sets, as further described with reference to FIG. 4. In such cases, the UE 115 may assume that a scheduled PDSCH may be rate matched around and/or into the resource set. In some examples, a configured rate matching resource set may be controlled by a bit in the DL grant or DCI, where the bit dynamically indicates if the PDSCH is rate matched into the resource set. In some examples, if the PDSCH is rate matched into the resource set, the CCEs where the DL grant (or DCI) is present may be rate matched around. In such cases, the UE 115 may skip PDCCH monitoring.

Figure 4:
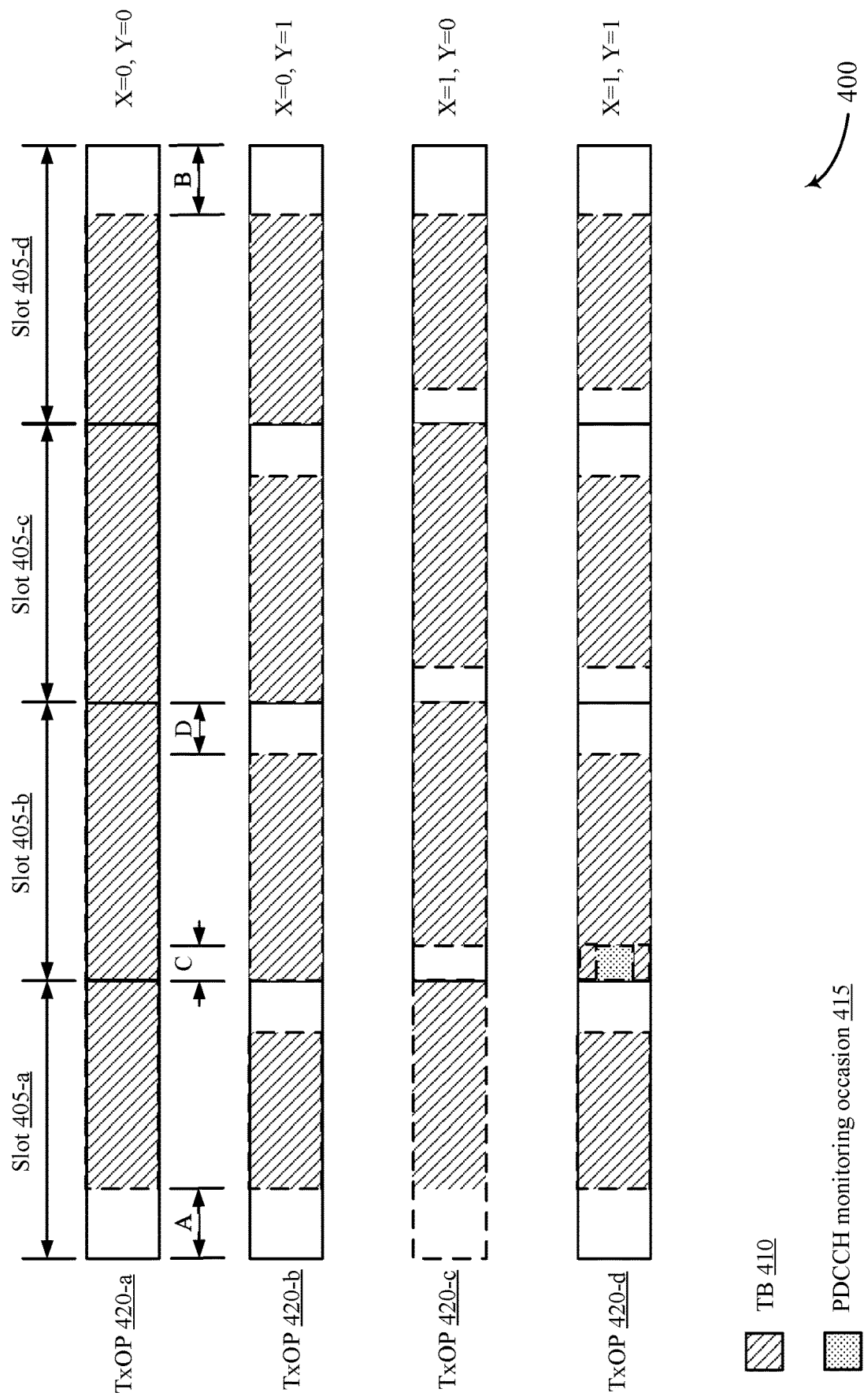
FIG. 4 illustrates an example of rate matching configurations in accordance with aspects of the present disclosure.

FIG. 4 illustrates examples of rate matching configurations 400 in accordance with aspects of the present disclosure. In some examples, the rate matching configurations 400 may be applicable to one or more slots 405 (e.g., slot 405-a, slot 405-b, slot 405-c, and slot 405-d). In some cases, the slots 405 may be divided into one or more time increments (e.g., OFDM symbols). In some cases, a TxOP 420 (e.g., TxOP 420-a, TxOP 420-b, TxOP 420-c, or TxOP 420-d) may span across multiple slots 405, and one or more rate matching resource sets may be defined for each transmission opportunity. In some cases, each TxOP 420 may carry one or more PDSCH TBs, and a UE 115 may use the one or more rate matching resource sets to perform rate matching of a set of data for transmission via the transmission opportunity. It should be noted that the rate matching concepts described with reference to DL shared channel transmissions may also apply for UL. In such cases, the UE 115 may utilize the rate matching resource sets, and configurations during PUSCH transmissions.

As described above with reference to FIG. 3, in some cases, a resource allocation pattern may be configured and signaled as an SLIV pattern, and may be indicated via DCI. In some cases, the SLIV pattern may assist a UE 115 in determining the time or frequency resources over which the DL data may be received. In some cases, the DCI may be used to define a rate matching configuration for a rate matching resource set, where the rate matching resource set includes a set of time-frequency resources (e.g., slots, RBs) allocated for rate matching. For instance, the DCI may be used to define a rate matching resource set C for each slot spanned by the flexible TB. Further, the rate matching resource set C may be formed by one or more resources (e.g., the first two (2) symbols) in a slot 405, such as slot 405-b, or slot 405-c. Additionally, a different rate matching resource set D including one or more resources (e.g., the last three (3) symbols) in a slot 405 (e.g., slot 405-b, or slot 405-c) may be defined by the DCI. In some cases, and as illustrated, the rate matching resource sets C and D may be defined for all slots except the first slot (e.g., slot 405-a) and last slot (e.g., slot 405-d), which may be configured using A and B instead. In some other cases, C may be defined for the last slot, and D may be defined for the first slot.

In some cases, two or more bits (e.g., X and Y) may be used in the DL grant DCI for purposes of rate matching control. In some cases, a first bit (e.g., X), and a second bit (e.g., Y) may be used to control rate matching into, or rate matching around for rate matching resource sets C, and D in each slot, respectively. For instance, for each bit, one value (e.g., 1) may be used to indicate rate matching around, while another different value (e.g., 0) may be used to indicate rate matching into. As illustrated, in TxOP 420-b, X has a value of 0, and Y has a value of 1. In this case, rate matching resource set C is rate matched into, while rate matching set D is rate matched around. Similarly, in TxOP 420-c, C is rate matched around (X=1), and Y is rate matched into (Y=0). For TxOP 420-a and TxOP 420-b, C and D are rate matched into, and around, respectively.

In some cases, rate matching may be supported for both DL (e.g., for PDSCH), as well as for UL (e.g., for PUSCH). In some aspects, one or more bits associated with rate matching may be utilized in both DL and UL grants. In some cases, when a configured PDCCH monitoring occasion is indicated for rate matching into, PDCCH monitoring may not be performed. In some other cases, when a configured PDCCH monitoring occasion is indicated for rate matching around, a UE 115 may or may not perform PDCCH monitoring, for instance, based on RRC signaling.

In some examples, C may be defined at a symbol-RB level, which may allow only a CORESET to be carved out for purposes of PDCCH monitoring. In such cases, the CORESET may span only a subset of subcarriers spanning the entire channel bandwidth. Thus, a CORESET may be surrounded on both sides in the frequency domain by the rate matched PDSCH. In one example, and as illustrated in TxOP 420-d, a PDCCH monitoring occasion 415 may be surrounded by shared channel TB 410.

Figure 5:
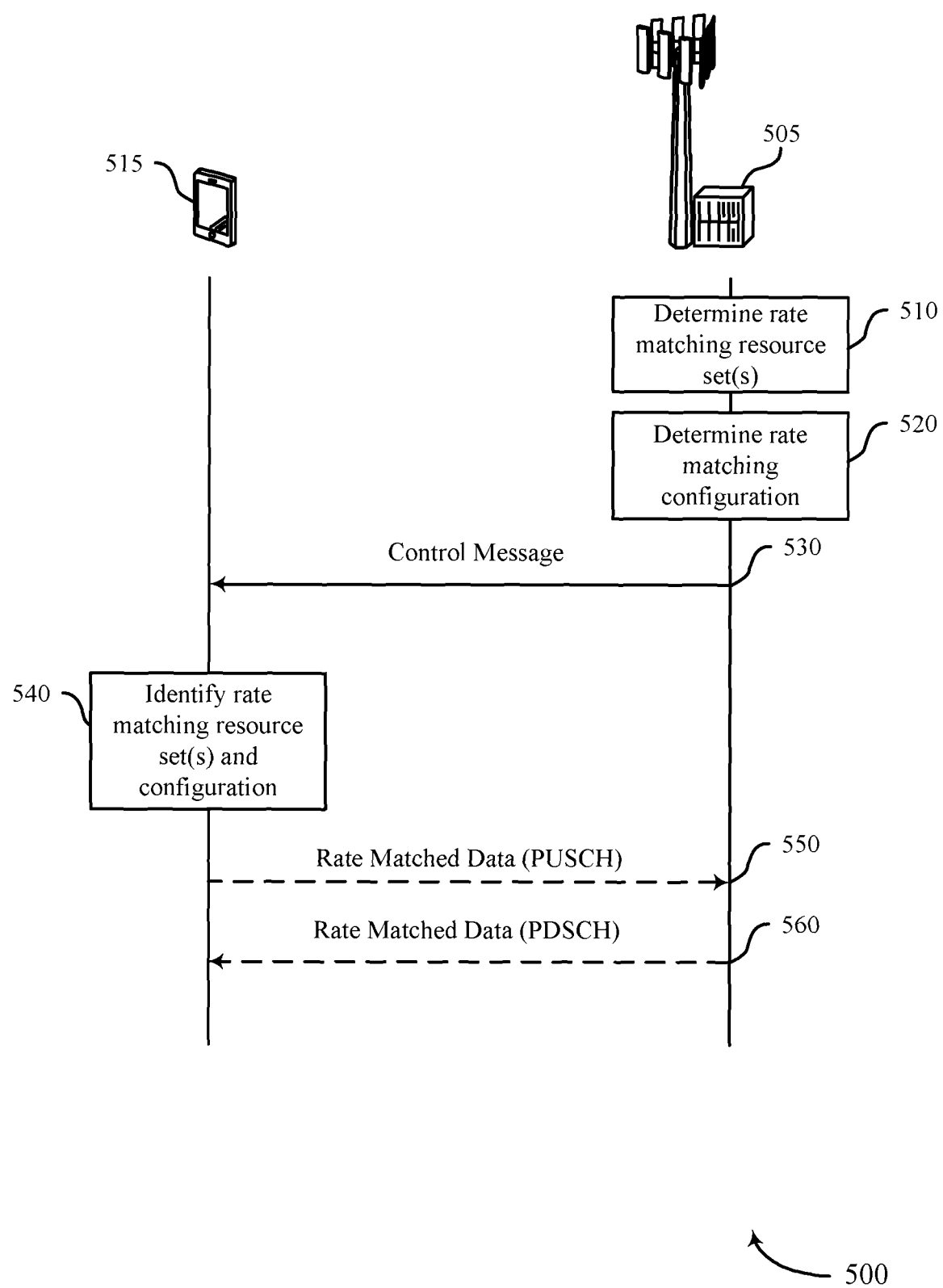
FIG. 5 illustrates an example of a process flow that supports rate matching resource sets for wireless systems in accordance with aspects of the present disclosure.

FIG. 5 illustrates an example of a process flow 500 that supports rate matching resource sets for wireless systems in accordance with aspects of the present disclosure. In some examples, process flow 500 may implement aspects of wireless communications systems 100 and/or 200, described with reference to FIGS. 1 and 2, and may be implemented by a UE 515, and a base station 505. In some examples, the process illustrated by process flow 500 may be implemented in a wireless system operating according to 5G NR RAT, although techniques described herein may be applied to any RAT.

At 510, base station 505 may determine one or more rate matching resource sets for a TTI of a shared channel (e.g., PUSCH, or PDSCH). In some cases, the rate matching resource sets may comprise a set of resources of the TTI allotted for rate matching. In some cases, the rate matching resource sets may be for one or more TTIs (or slots) subject to a multi-slot grant. In some cases, there may be a rate matching resource set associated with an initial TTI of the multi-TTI grant, a second rate matching resource set associated with an intermediate TTI of the multi-TTI grant, and a third rate matching resource set associated with a last TTI of the multi-TTI grant.

At 520, base station 505 may determine a rate matching configuration for the rate matching resource set. In some cases, a rate matching configuration for the set may include a rate matching indicator including one or more bits used to indicate a configuration (e.g., rate match into, or rate match around) for the set. In some cases, the base station 505 may indicate the rate configuration for the set via the multi-TTI grant, or DCI.

At 530, base station 505 may transmit a control message including an indication of the rate matching configurations for the one or more rate matching resource sets. In some cases, the control message may be DCI, RRC, or any other type of DL signaling. In some cases, the base station 505 may also indicate the location of the resources associated with the rate matching resource sets via RRC signaling.

At 540, UE 515 may identify the one or more rate matching resource sets, and their respective configurations for the TTI of the shared channel, based in part on the multi-TTI grant for the shared channel. In some cases, the UE 115 may have previously received an indication of the multi-TTI grant from the base station 505, via DCI. In some cases, the received control message may comprise a rate matching indicator for a rate matching resource set, where the rate matching indicator indicates whether to rate match around the set of symbols of the TTI, or rate match into the set of symbols of the TTI. In some examples, the UE 515 may also identify a start and length indicator conveying a starting symbol, an ending symbol, and a number of slots spanned by the multi-TTI grant.

In some cases, at 550 and/or 560, the UE 515 may perform rate matching of a set of data for communication via one or more TTIs, based at least in part on the rate matching resource sets, and the rate matching configurations. Further, in some cases, the UE 515 may transmit to the base station 505 the rate matched set of data via one or more TTIs. In some other cases, the UE 515 may receive, from the base station 505, rate matched set of data via one or more TTIs. In some cases, rate matching performed at a receiver side may also be referred to as de-rate matching.

Figure 6:
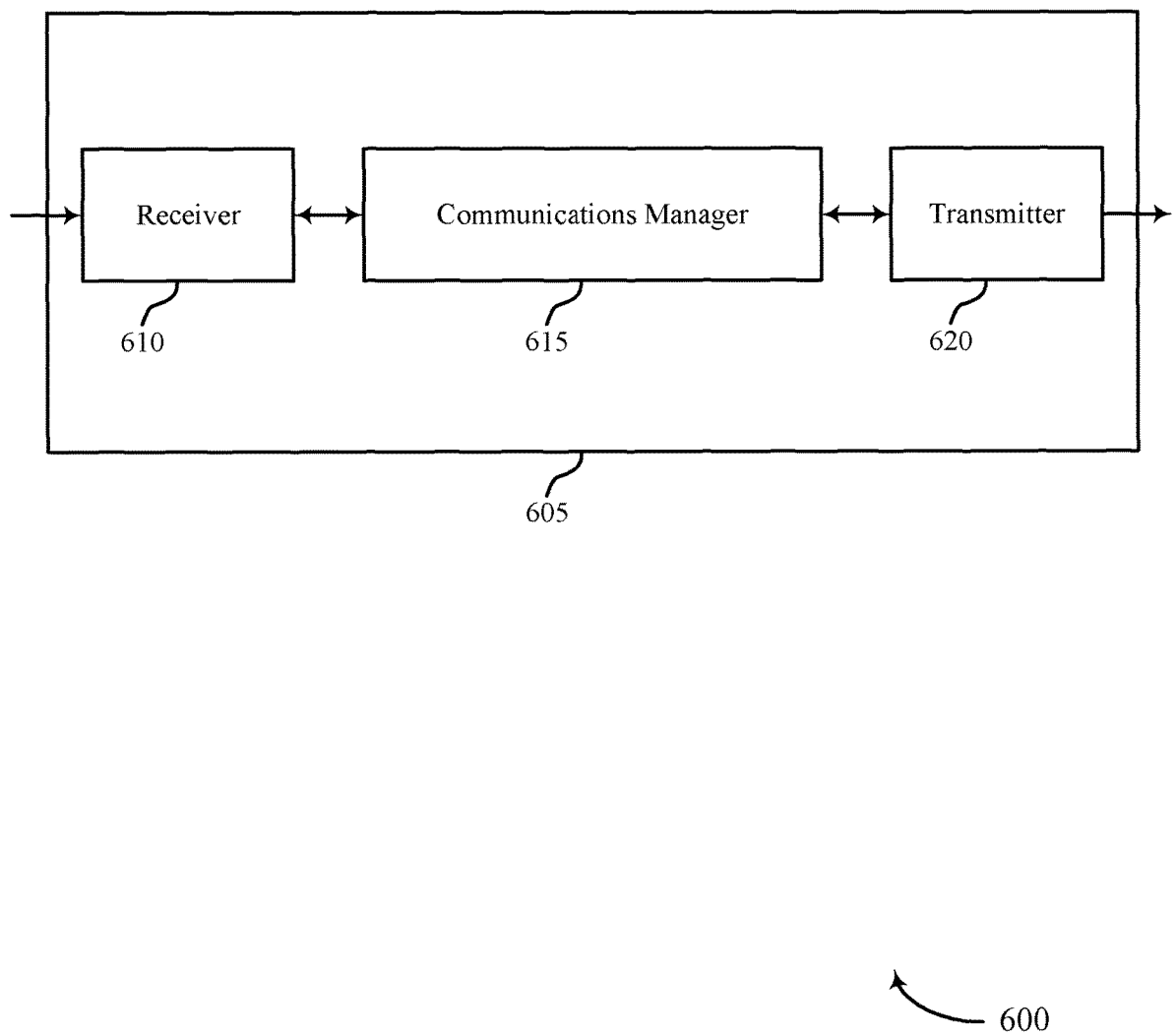
FIGS. 6 and 7 show block diagrams of devices that support rate matching resource sets for wireless systems in accordance with aspects of the present disclosure.

FIG. 6 shows a block diagram 600 of a device 605 that supports rate matching resource sets for wireless systems in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to rate matching resource sets for wireless systems). Information may be passed on to other components of the device 605. The receiver 610 may be an example of aspects of the transceiver 920 described with reference to FIG. 9. The receiver 610 may utilize a single antenna or multiple antennas.

The communications manager 615 may identify a rate matching resource set for a TTI of a shared channel, where the rate matching resource set includes resources of the TTI allocated for rate matching, receive, from a base station, a multi-TTI grant for communication via the shared channel over multiple TTIs, where the multi-TTI grant includes an indication of a rate matching configuration for the rate matching resource set, perform rate matching of a set of data based on the rate matching resource set and the rate matching configuration, and exchange the rate matched set of data with the base station via the TTI. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or multiple antennas.

Figure 7:
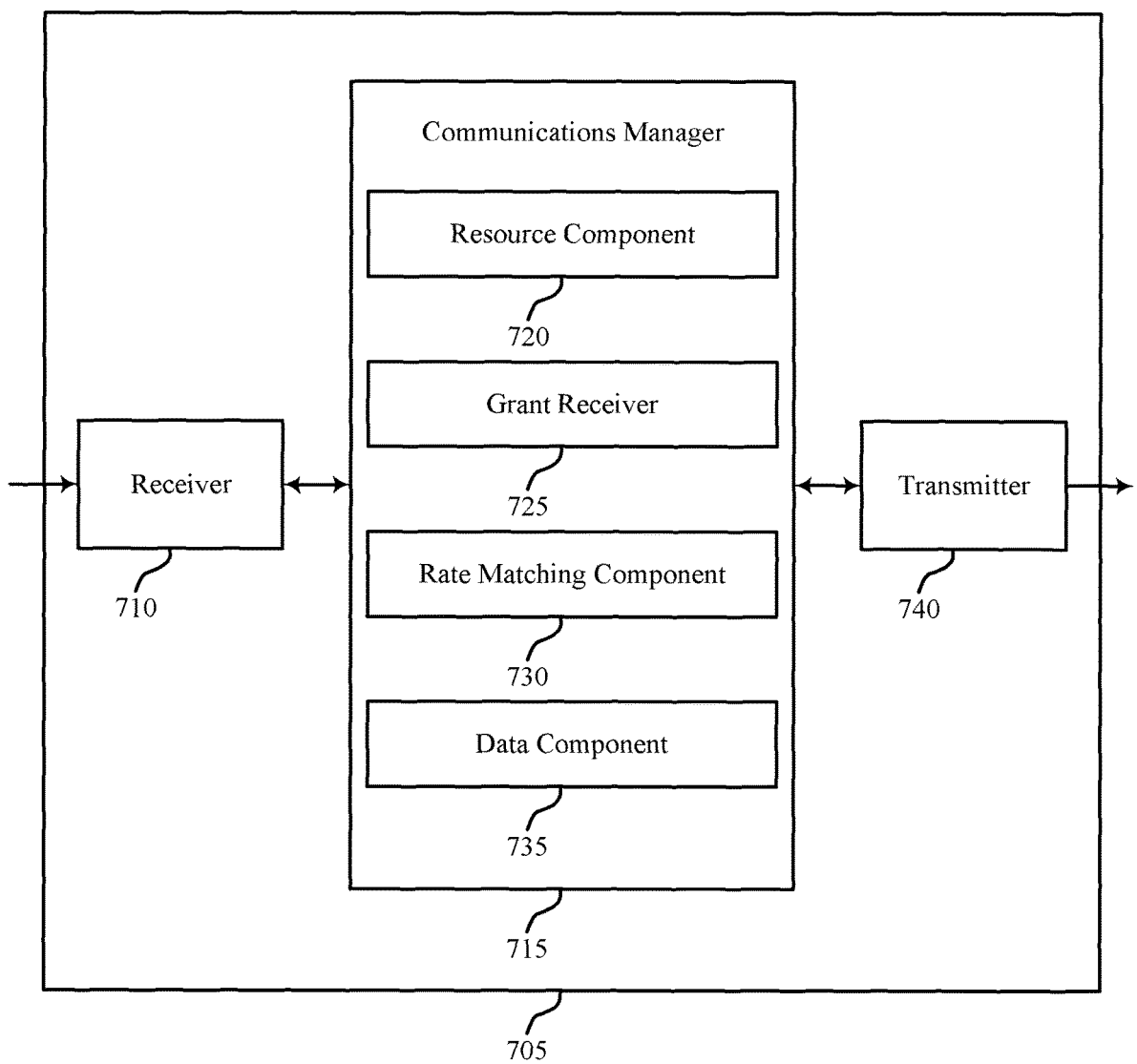

FIG. 7 shows a block diagram 700 of a device 705 that supports rate matching resource sets for wireless systems in accordance with aspects of the present disclosure. The device 705 may be an example of aspects of a device 605 or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to rate matching resource sets for wireless systems). Information may be passed on to other components of the device 705. The receiver 710 may be an example of aspects of the transceiver 920 described with reference to FIG. 9. The receiver 710 may utilize a single antenna or multiple antennas.

The communications manager 715 may be an example of aspects of the communications manager 615 as described herein. The communications manager 715 may include a resource component 720, a grant receiver 725, a rate matching component 730, and a data component 735. The communications manager 715 may be an example of aspects of the communications manager 910 described herein.

The resource component 720 may identify a rate matching resource set for a TTI of a shared channel, where the rate matching resource set includes resources of the TTI allocated for rate matching.

The grant receiver 725 may receive, from a base station, a multi-TTI grant for communication via the shared channel over multiple TTIs, where the multi-TTI grant includes an indication of a rate matching configuration for the rate matching resource set.

The rate matching component 730 may perform rate matching of a set of data based on the rate matching resource set and the rate matching configuration.

The data component 735 may exchange the rate matched set of data with the base station via the TTI.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or multiple antennas.

Figure 8:
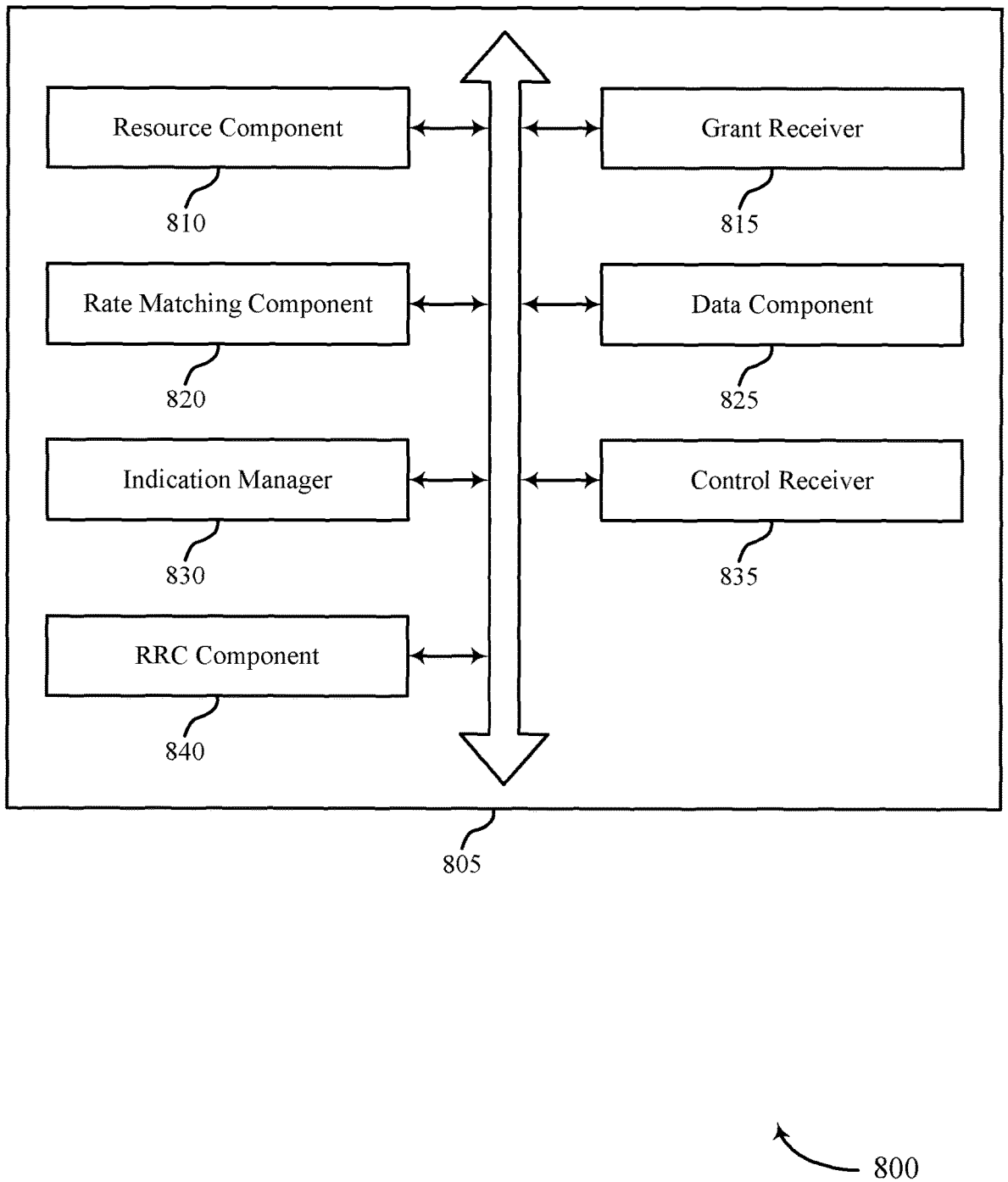
FIG. 8 shows a block diagram of a communications manager that supports rate matching resource sets for wireless systems in accordance with aspects of the present disclosure.

FIG. 8 shows a block diagram 800 of a communications manager 805 that supports rate matching resource sets for wireless systems in accordance with aspects of the present disclosure. The communications manager 805 may be an example of aspects of a communications manager 615, a communications manager 715, or a communications manager 910 described herein. The communications manager 805 may include a resource component 810, a grant receiver 815, a rate matching component 820, a data component 825, an indication manager 830, a control receiver 835, and an RRC component 840. Each of these modules may communicate, directly or indirectly, with one another (e.g., via one or more buses).

The resource component 810 may identify a rate matching resource set for a TTI of a shared channel, where the rate matching resource set includes resources of the TTI allocated for rate matching. In some examples, the resource component 810 may determine the rate matching resource set based on the multi-TTI grant. In some cases, the resource component 810 may receive, from the base station via RRC signaling, an indication of the rate matching resource set. In some aspects, identifying a second rate matching resource set for the TTI, where the second rate matching resource set includes second resources of the TTI allocated for rate matching.

In some instances, the resource component 810 may determine the rate matching resource set based on the starting symbol, the ending symbol, the number of TTIs for the multi-TTI grant, or a combination thereof. In some cases, the rate matching resource set is associated with an initial set of resources of the TTI. In some examples, the second rate matching resource set is associated with a last set of resources of the TTI. In some aspects, the rate matching resource set includes one or more symbols or resource blocks at a beginning of the TTI. In some instances, the second rate matching resource set includes one or more symbols or resource blocks at an end of the TTI.

The grant receiver 815 may receive, from a base station, a multi-TTI grant for communication via the shared channel over multiple TTIs, where the multi-TTI grant includes an indication of a rate matching configuration for the rate matching resource set.

In some examples, the grant receiver 815 may receive, from the base station as part of the multi-TTI grant, an indication of a second rate matching configuration for the second rate matching resource set.

The rate matching component 820 may perform rate matching of a set of data based on the rate matching resource set and the rate matching configuration. In some examples, the rate matching component 820 may perform rate matching of the shared channel based on the rate matching configuration, where rate matching is performed around or into the resources of the TTI configured for a PRACH, a PUCCH, a PBCH, a synchronization signal, a reference signal, a PDCCH, a CCA gap, or any combination thereof.

The data component 825 may exchange the rate matched set of data with the base station via the TTI. In some examples, the data component 825 may receive the set of data via the TTI rate matched around a PDCCH. In some cases, the data component 825 may refrain from monitoring a PDCCH occasion in a subsequent TTI. In some other cases, the data component 825 may proceed to monitor a PDCCH occasion in the same, or a subsequent TTI. In some aspects, the data component 825 may receive the rate matched set of data via a PDSCH. In some instances, the data component 825 may transmit the rate matched set of data via a PUSCH.

The indication manager 830 may receive, from the base station as part of the rate matching configuration, a rate matching indicator for the rate matching resource set, where the rate matching indicator indicates whether to rate match around the resources of the TTI or rate match into the resources of the TTI for each TTI of the multi-TTI grant. In some examples, the indication manager 830 may receive the rate matching indicator for each TTI of the multi-TTI grant, where each rate matching indicator includes a set of two or more bits indicating the rate matching configuration for the rate matching resource set and the second rate matching resource set for each TTI of the multi-TTI grant.

The control receiver 835 may receive, from the base station, a start and length indicator value that conveys a starting symbol, an ending symbol, and a number of TTIs for the multi-TTI grant. In some cases, the start and length indicator value is received via DCI.

The RRC component 840 may receive, from the base station via RRC signaling, an indication of the rate matching resource set.

Figure 9:
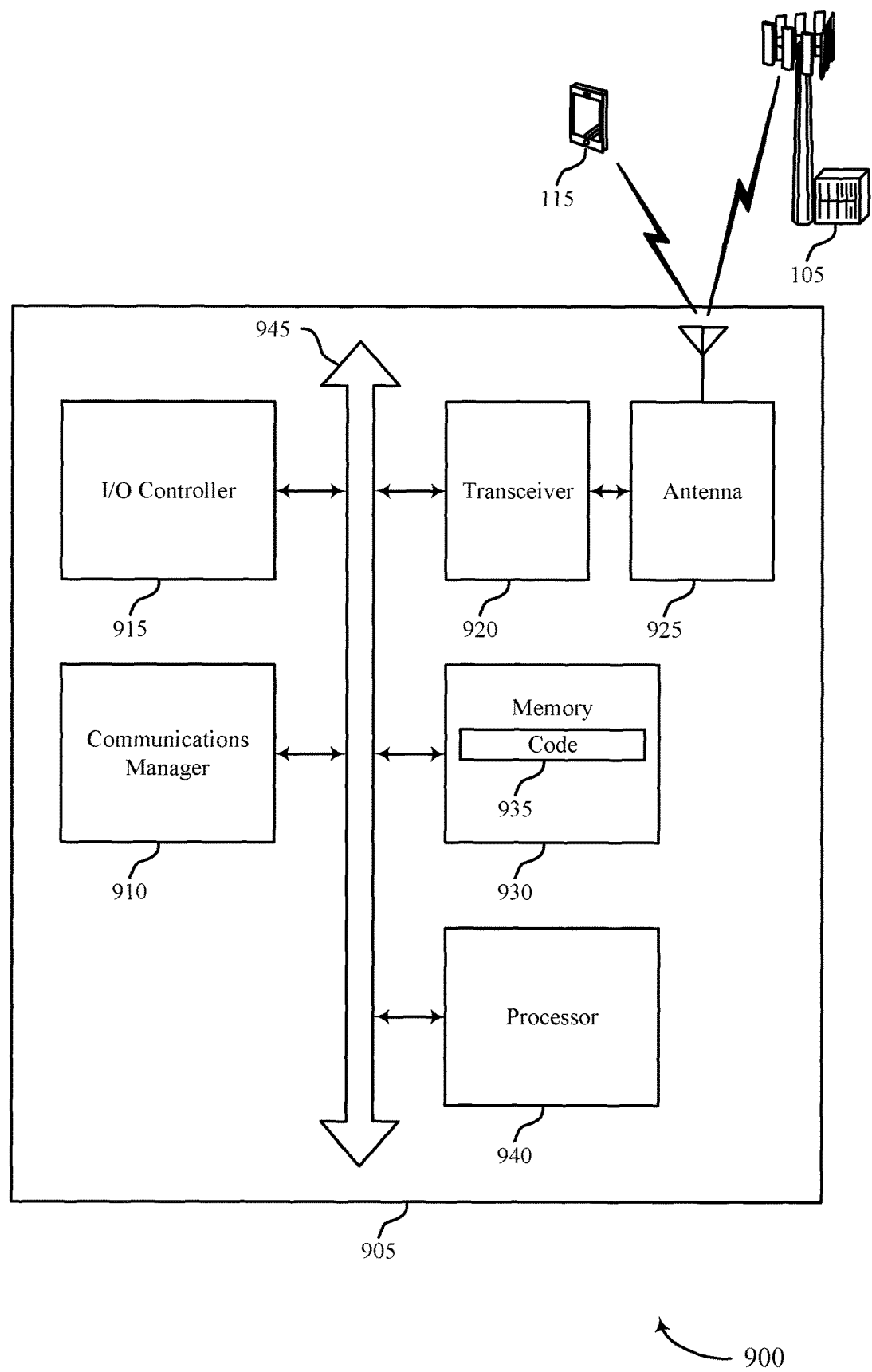
FIG. 9 shows a diagram of a system including a device that supports rate matching resource sets for wireless systems in accordance with aspects of the present disclosure.

FIG. 9 shows a diagram of a system 900 including a device 905 that supports rate matching resource sets for wireless systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a rate matching resource set for a TTI of a shared channel, where the rate matching resource set includes resources of the TTI allocated for rate matching, receive, from a base station, a multi-TTI grant for communication via the shared channel over multiple TTIs, where the multi-TTI grant includes an indication of a rate matching configuration for the rate matching resource set, perform rate matching of a set of data based on the rate matching resource set and the rate matching configuration, and exchange the rate matched set of data with the base station via the TTI.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting rate matching resource sets for wireless systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
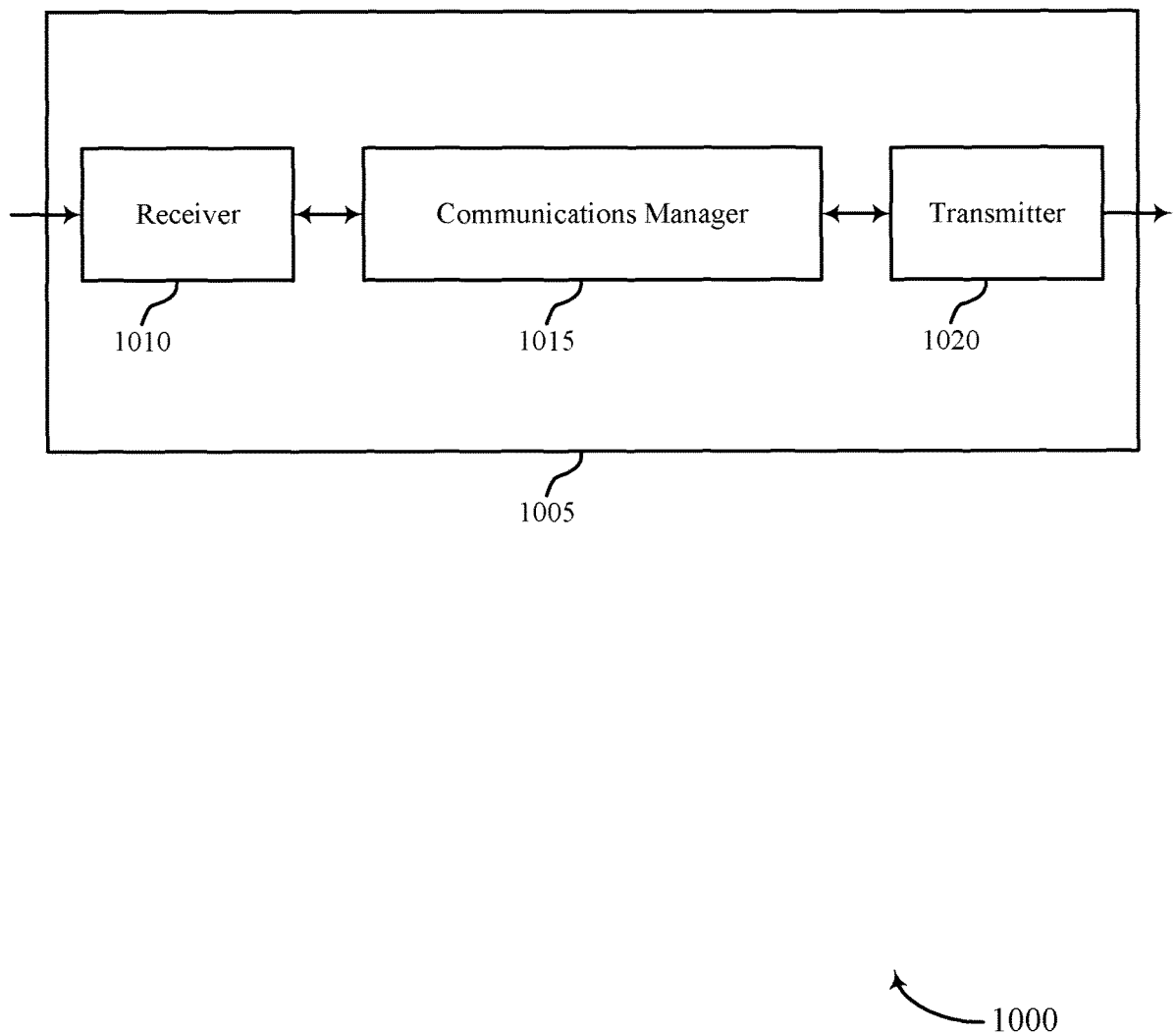
FIGS. 10 and 11 show block diagrams of devices that support rate matching resource sets for wireless systems in accordance with aspects of the present disclosure.

FIG. 10 shows a block diagram 1000 of a device 1005 that supports rate matching resource sets for wireless systems in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to rate matching resource sets for wireless systems). Information may be passed on to other components of the device 1005. The receiver 1010 may be an example of aspects of the transceiver 1320 described with reference to FIG. 13. The receiver 1010 may utilize a single antenna or multiple antennas.

The communications manager 1015 may determine a rate matching resource set for a TTI of a shared channel, where the rate matching resource set includes resources of the TTI allocated for rate matching, determine a rate matching configuration for the rate matching resource set, transmit, to a UE, a multi-TTI grant for communication via the shared channel over multiple TTIs, where the multi-TTI grant includes an indication of the rate matching configuration for the rate matching resource set, perform rate matching of a set of data based on the rate matching resource set and the rate matching configuration, and exchange the rate matched set of data with the UE via the TTI. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or multiple antennas.

Figure 11:
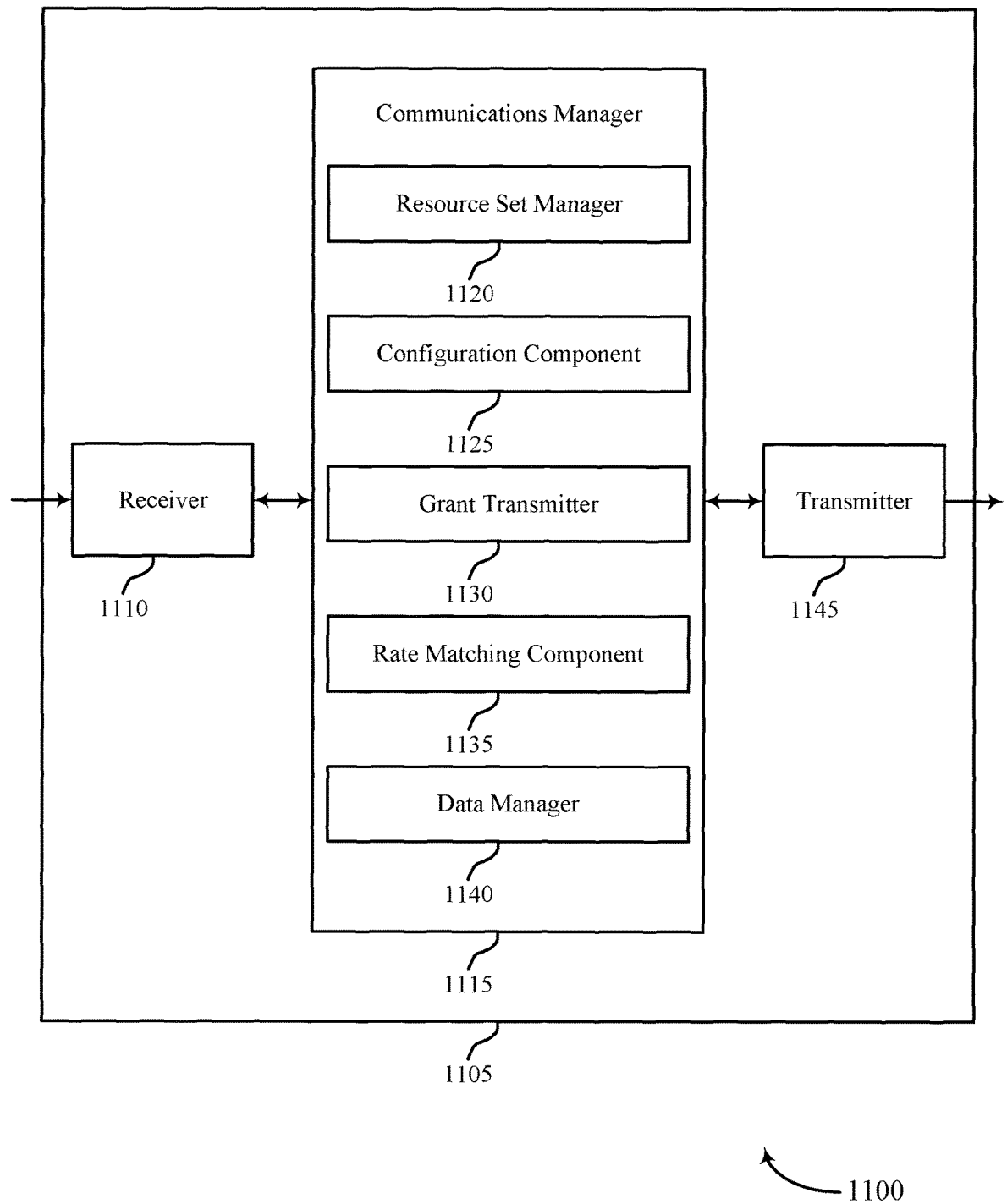

FIG. 11 shows a block diagram 1100 of a device 1105 that supports rate matching resource sets for wireless systems in accordance with aspects of the present disclosure. The device 1105 may be an example of aspects of a device 1005 or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to rate matching resource sets for wireless systems). Information may be passed on to other components of the device 1105. The receiver 1110 may be an example of aspects of the transceiver 1320 described with reference to FIG. 13. The receiver 1110 may utilize a single antenna or multiple antennas.

The communications manager 1115 may be an example of aspects of the communications manager 1015 as described herein. The communications manager 1115 may include a resource set manager 1120, a configuration component 1125, a grant transmitter 1130, a rate matching component 1135, and a data manager 1140. The communications manager 1115 may be an example of aspects of the communications manager 1310 described herein.

The resource set manager 1120 may determine a rate matching resource set for a TTI of a shared channel, where the rate matching resource set includes resources of the TTI allocated for rate matching.

The configuration component 1125 may determine a rate matching configuration for the rate matching resource set.

The grant transmitter 1130 may transmit, to a UE, a multi-TTI grant for communication via the shared channel over multiple TTIs, where the multi-TTI grant includes an indication of the rate matching configuration for the rate matching resource set.

The rate matching component 1135 may perform rate matching of a set of data based on the rate matching resource set and the rate matching configuration.

The data manager 1140 may exchange the rate matched set of data with the UE via the TTI.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or multiple antennas.

Figure 12:
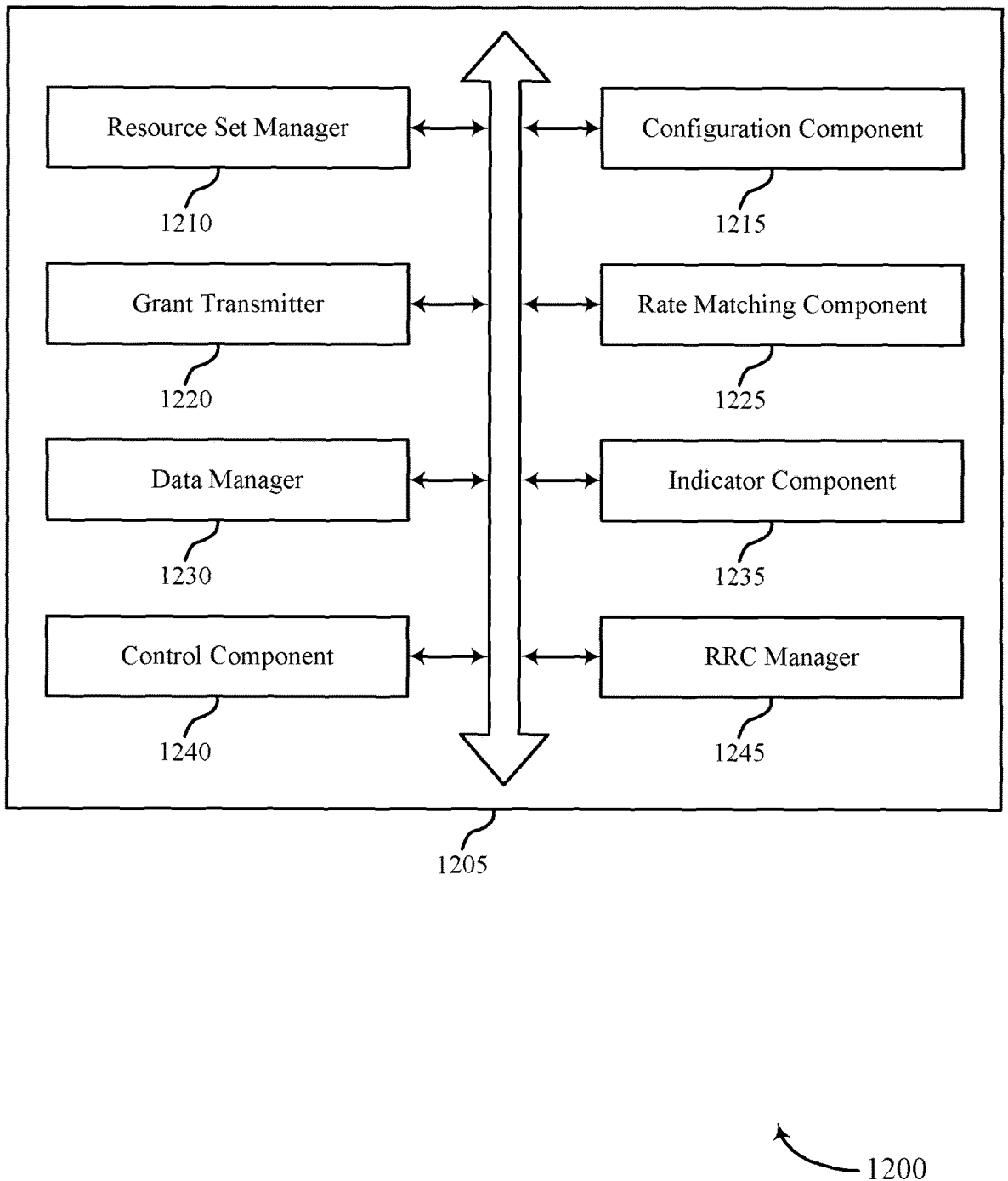
FIG. 12 shows a block diagram of a communications manager that supports rate matching resource sets for wireless systems in accordance with aspects of the present disclosure.

FIG. 12 shows a block diagram 1200 of a communications manager 1205 that supports rate matching resource sets for wireless systems in accordance with aspects of the present disclosure. The communications manager 1205 may be an example of aspects of a communications manager 1015, a communications manager 1115, or a communications manager 1310 described herein. The communications manager 1205 may include a resource set manager 1210, a configuration component 1215, a grant transmitter 1220, a rate matching component 1225, a data manager 1230, an indicator component 1235, a control component 1240, and an RRC manager 1245. Each of these modules may communicate, directly or indirectly, with one another (e.g., via one or more buses).

The resource set manager 1210 may determine a rate matching resource set for a TTI of a shared channel, where the rate matching resource set includes resources of the TTI allocated for rate matching.

In some examples, determining a second rate matching resource set for the TTI, where the second rate matching resource set includes second resources of the TTI allocated for rate matching. In some cases, the rate matching resource set is associated with an initial set of resources of the TTI. In some aspects, the second rate matching resource set is associated with a last set of resources of the TTI. In some instances, the rate matching resource set includes one or more symbols or resource blocks at a beginning of the TTI. In some examples, the second rate matching resource set includes one or more symbols or resource blocks at an end of the TTI.

The configuration component 1215 may determine a rate matching configuration for the rate matching resource set. In some examples, the configuration component 1215 may determine a second rate matching configuration for the second rate matching resource set.

The grant transmitter 1220 may transmit, to a UE, a multi-TTI grant for communication via the shared channel over multiple TTIs, where the multi-TTI grant includes an indication of the rate matching configuration for the rate matching resource set. In some examples, the grant transmitter 1220 may transmit, to the UE as part of the multi-TTI grant, an indication of the second rate matching configuration for the second rate matching resource set.

The rate matching component 1225 may perform rate matching of a set of data based on the rate matching resource set and the rate matching configuration.

In some examples, the rate matching component 1225 may perform rate matching of the shared channel based on the rate matching configuration, where rate matching is performed around or into the resources of the TTI configured for a PRACH, a PUCCH, a PBCH, a synchronization signal, a reference signal, a PDCCH, a CCA gap, or any combination thereof.

The data manager 1230 may exchange the rate matched set of data with the UE via the TTI. In some examples, the data manager 1230 may transmit the rate matched set of data via a PDSCH. In some cases, the data manager 1230 may receive the rate matched set of data via a PUSCH.

The indicator component 1235 may transmit, to the UE as part of the rate matching configuration, a rate matching indicator for the rate matching resource set and the second rate matching resource set, where the rate matching indicator indicates whether to rate match around the resources of the TTI or rate match into the resources of the TTI for each TTI of the multi-TTI grant. In some examples, the indicator component 1235 may transmit the rate matching indicator for each TTI of the multi-TTI grant, where each rate matching indicator include a set of two or more bits indicating the rate matching configuration for the rate matching resource set and the second rate matching resource set for each TTI of the multi-TTI grant.

The control component 1240 may transmit, to the UE, a start and length indicator value that conveys a starting symbol, an ending symbol, and a number of TTIs for the multi-TTI grant. In some examples, the control component 1240 may configure the UE to determine the rate matching resource set based on the starting symbol, the ending symbol, the number of TTIs for the multi-TTI grant, or a combination thereof. In some cases, the start and length indicator value is transmitted via DCI.

The RRC manager 1245 may transmit, to the UE via RRC signaling, an indication of the rate matching resource set.

Figure 13:
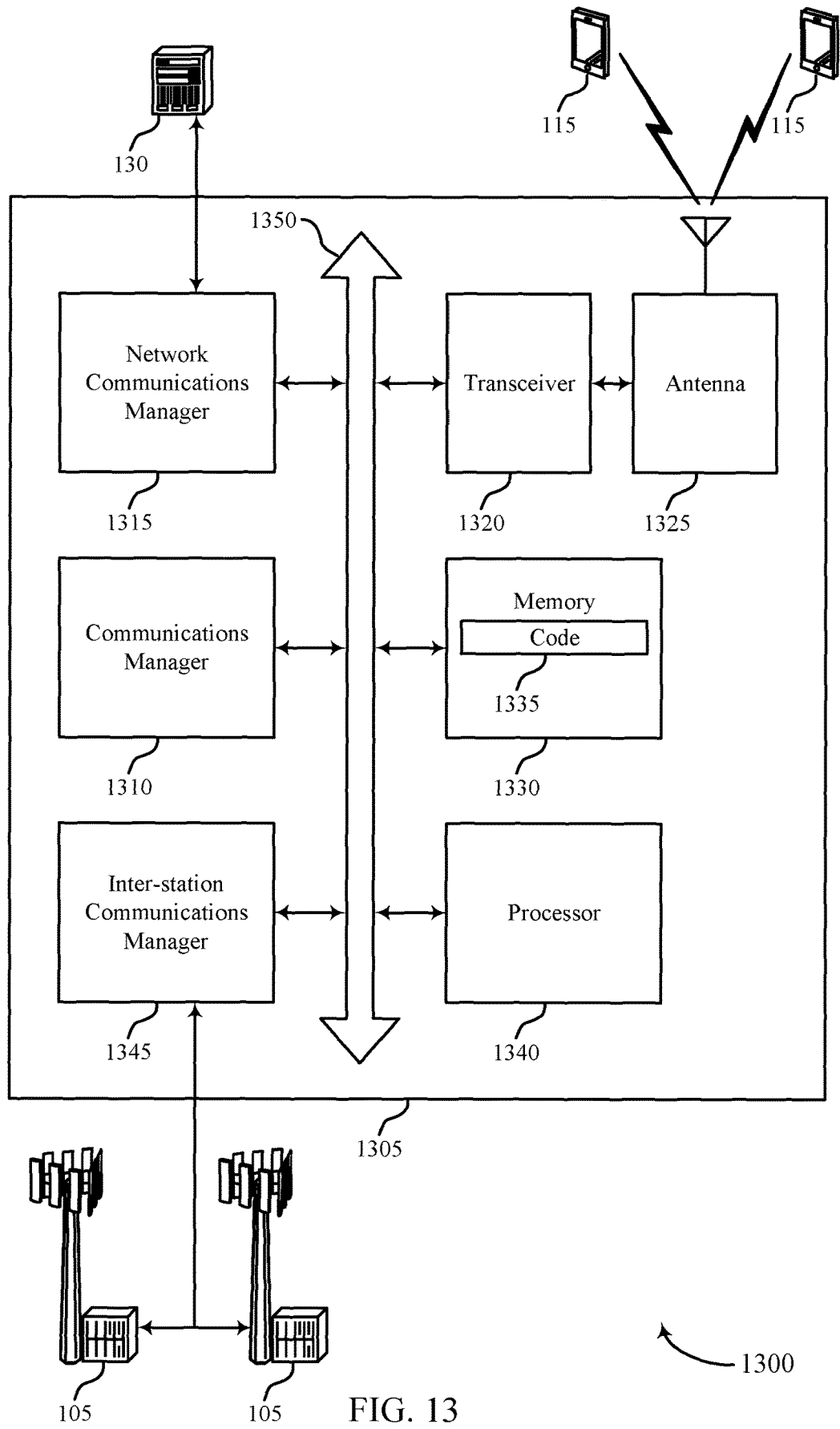
FIG. 13 shows a diagram of a system including a device that supports rate matching resource sets for wireless systems in accordance with aspects of the present disclosure.

FIG. 13 shows a diagram of a system 1300 including a device 1305 that supports rate matching resource sets for wireless systems in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a rate matching resource set for a TTI of a shared channel, where the rate matching resource set includes resources of the TTI allocated for rate matching, determine a rate matching configuration for the rate matching resource set, transmit, to a UE, a multi-TTI grant for communication via the shared channel over multiple TTIs, where the multi-TTI grant includes an indication of the rate matching configuration for the rate matching resource set, perform rate matching of a set of data based on the rate matching resource set and the rate matching configuration, and exchange the rate matched set of data with the UE via the TTI.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the 1305 to perform various functions (e.g., functions or tasks supporting rate matching resource sets for wireless systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
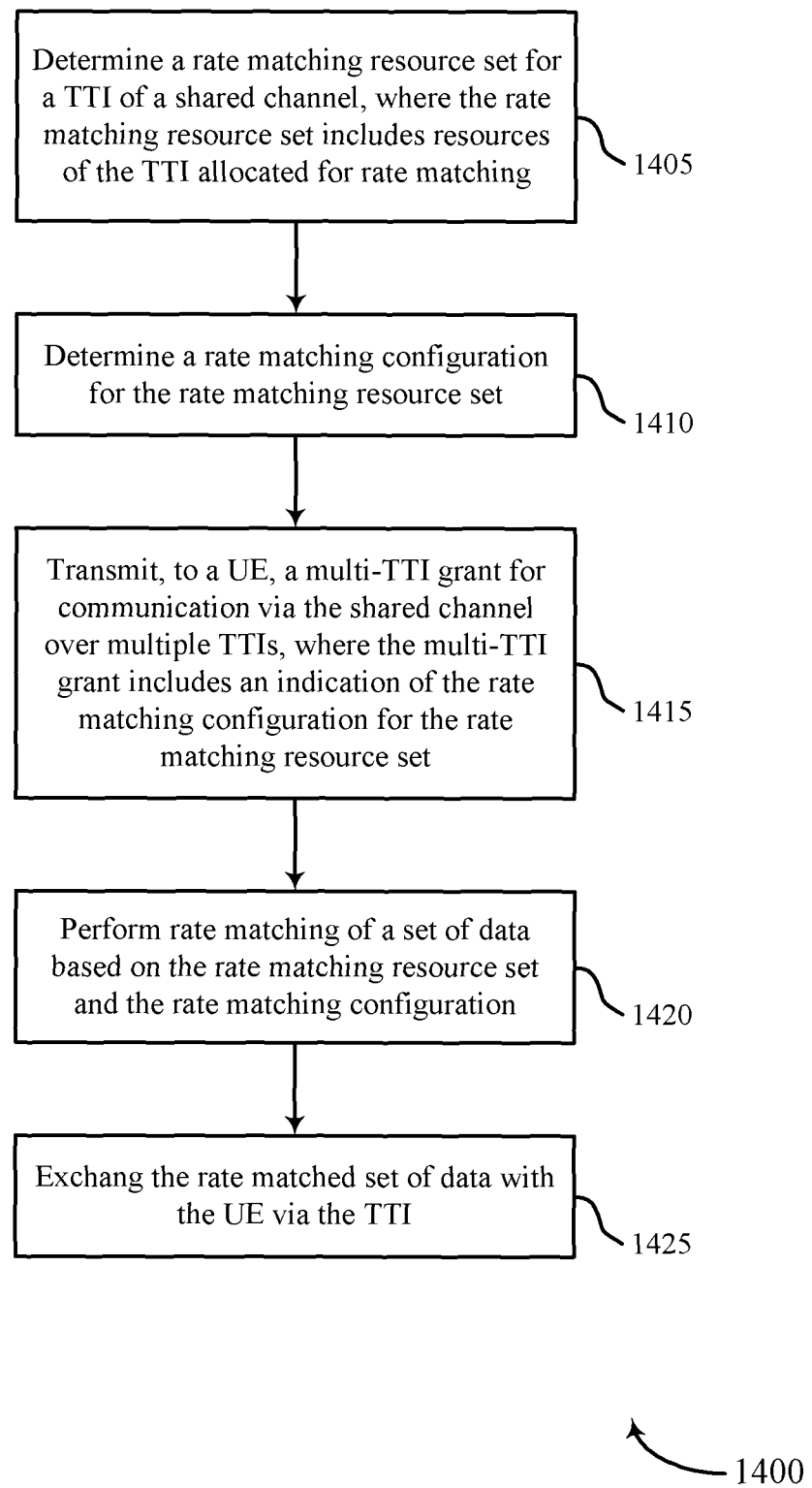
FIGS. 14 through 19 show flowcharts illustrating methods that support rate matching resource sets for wireless systems in accordance with aspects of the present disclosure.

FIG. 14 shows a flowchart illustrating a method 1400 that supports rate matching resource sets for wireless systems in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1405, the base station may determine a rate matching resource set for a TTI of a shared channel, where the rate matching resource set includes resources of the TTI allocated for rate matching. The operations of 1405 may be performed according to the methods described herein. In some examples, aspects of the operations of 1405 may be performed by a resource set manager as described with reference to FIGS. 10 through 13.

At 1410, the base station may determine a rate matching configuration for the rate matching resource set. The operations of 1410 may be performed according to the methods described herein. In some examples, aspects of the operations of 1410 may be performed by a configuration component as described with reference to FIGS. 10 through 13.

At 1415, the base station may transmit, to a UE, a multi-TTI grant for communication via the shared channel over multiple TTIs, where the multi-TTI grant includes an indication of the rate matching configuration for the rate matching resource set. The operations of 1415 may be performed according to the methods described herein. In some examples, aspects of the operations of 1415 may be performed by a grant transmitter as described with reference to FIGS. 10 through 13.

At 1420, the base station may perform rate matching of a set of data based on the rate matching resource set and the rate matching configuration. The operations of 1420 may be performed according to the methods described herein. In some examples, aspects of the operations of 1420 may be performed by a rate matching component as described with reference to FIGS. 10 through 13.

At 1425, the base station may exchange the rate matched set of data with the UE via the TTI. The operations of 1425 may be performed according to the methods described herein. In some examples, aspects of the operations of 1425 may be performed by a data manager as described with reference to FIGS. 10 through 13.

Figure 15:
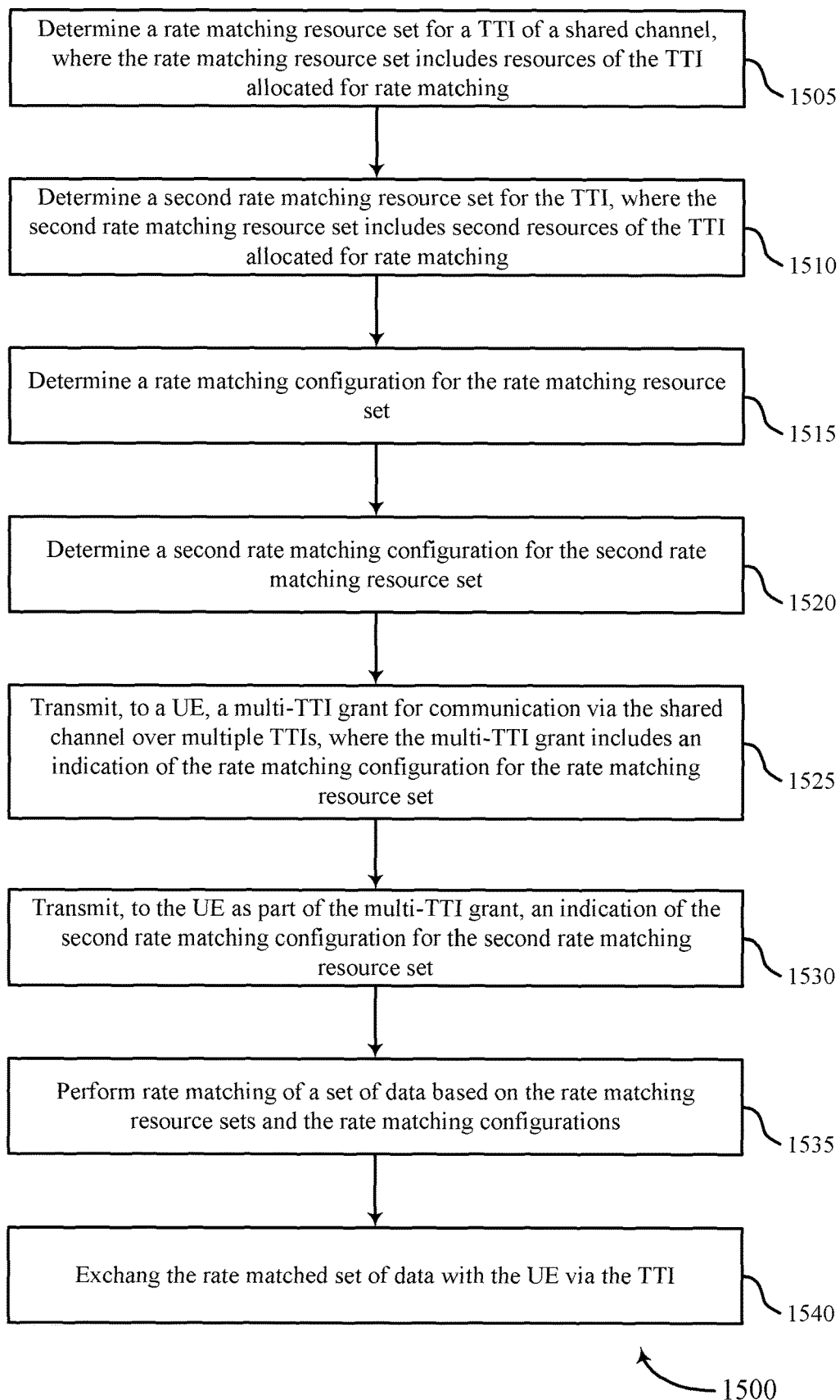

FIG. 15 shows a flowchart illustrating a method 1500 that supports rate matching resource sets for wireless systems in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1505, the base station may determine a rate matching resource set for a TTI of a shared channel, where the rate matching resource set includes resources of the TTI allocated for rate matching. The operations of 1505 may be performed according to the methods described herein. In some examples, aspects of the operations of 1505 may be performed by a resource set manager as described with reference to FIGS. 10 through 13.

At 1510, the base station may determine a second rate matching resource set for the TTI, where the second rate matching resource set includes second resources of the TTI allocated for rate matching. The operations of 1510 may be performed according to the methods described herein. In some examples, aspects of the operations of 1510 may be performed by a resource set manager as described with reference to FIGS. 10 through 13.

At 1515, the base station may determine a rate matching configuration for the rate matching resource set. The operations of 1515 may be performed according to the methods described herein. In some examples, aspects of the operations of 1515 may be performed by a configuration component as described with reference to FIGS. 10 through 13.

At 1520, the base station may determine a second rate matching configuration for the second rate matching resource set. The operations of 1520 may be performed according to the methods described herein. In some examples, aspects of the operations of 1520 may be performed by a configuration component as described with reference to FIGS. 10 through 13.

At 1525, the base station may transmit, to a UE, a multi-TTI grant for communication via the shared channel over multiple TTIs, where the multi-TTI grant includes an indication of the rate matching configuration for the rate matching resource set. The operations of 1525 may be performed according to the methods described herein. In some examples, aspects of the operations of 1525 may be performed by a grant transmitter as described with reference to FIGS. 10 through 13.

At 1530, the base station may transmit, to the UE as part of the multi-TTI grant, an indication of the second rate matching configuration for the second rate matching resource set. The operations of 1530 may be performed according to the methods described herein. In some examples, aspects of the operations of 1530 may be performed by a grant transmitter as described with reference to FIGS. 10 through 13.

At 1535, the base station may perform rate matching of a set of data based on the rate matching resource sets and the rate matching configurations. The operations of 1535 may be performed according to the methods described herein. In some examples, aspects of the operations of 1535 may be performed by a rate matching component as described with reference to FIGS. 10 through 13.

At 1540, the base station may exchange the rate matched set of data with the UE via the TTI. The operations of 1540 may be performed according to the methods described herein. In some examples, aspects of the operations of 1540 may be performed by a data manager as described with reference to FIGS. 10 through 13.

Figure 16:
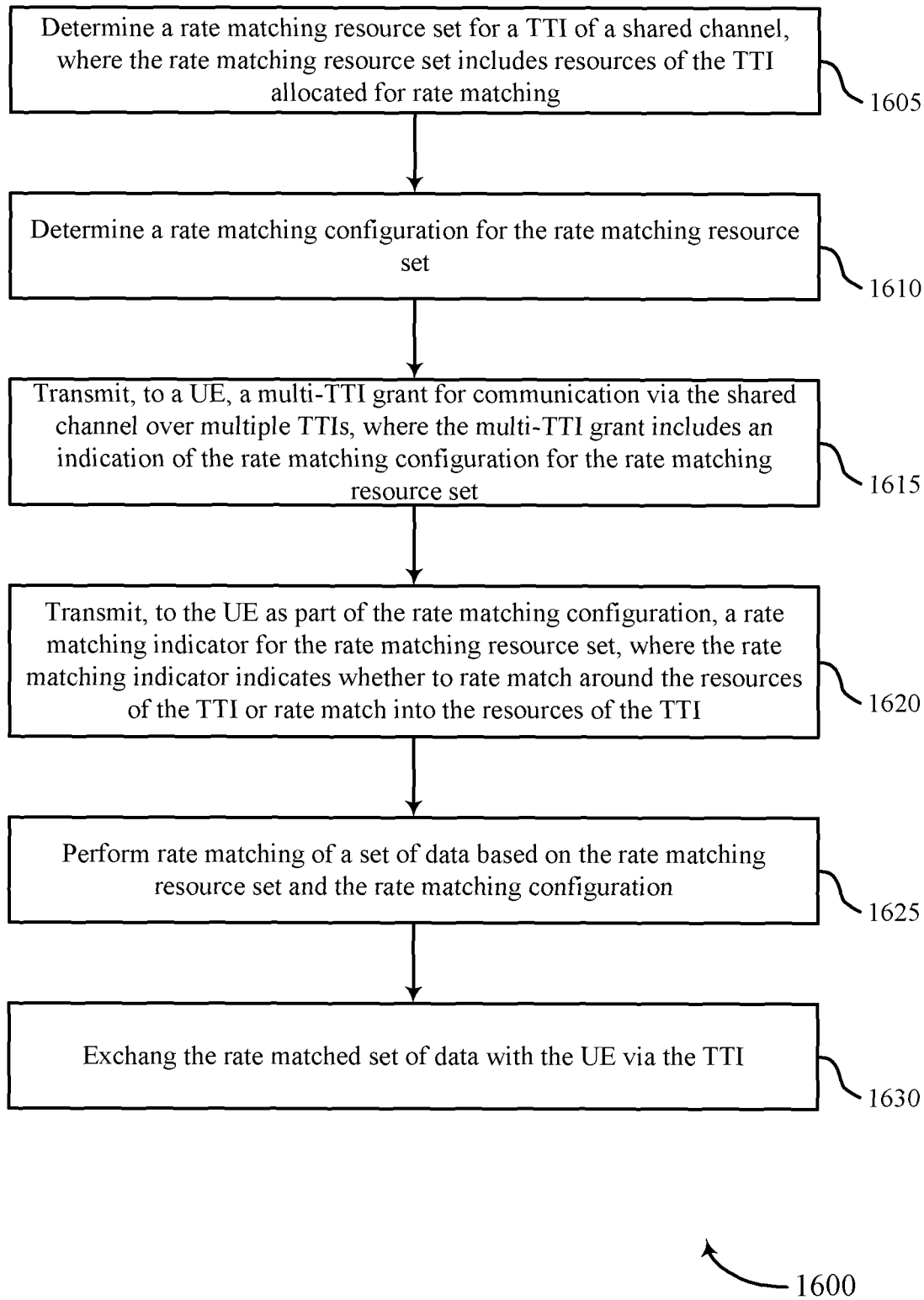

FIG. 16 shows a flowchart illustrating a method 1600 that supports rate matching resource sets for wireless systems in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1605, the base station may determine a rate matching resource set for a TTI of a shared channel, where the rate matching resource set includes resources of the TTI allocated for rate matching. The operations of 1605 may be performed according to the methods described herein. In some examples, aspects of the operations of 1605 may be performed by a resource set manager as described with reference to FIGS. 10 through 13.

At 1610, the base station may determine a rate matching configuration for the rate matching resource set. The operations of 1610 may be performed according to the methods described herein. In some examples, aspects of the operations of 1610 may be performed by a configuration component as described with reference to FIGS. 10 through 13.

At 1615, the base station may transmit, to a UE, a multi-TTI grant for communication via the shared channel over multiple TTIs, where the multi-TTI grant includes an indication of the rate matching configuration for the rate matching resource set. The operations of 1615 may be performed according to the methods described herein. In some examples, aspects of the operations of 1615 may be performed by a grant transmitter as described with reference to FIGS. 10 through 13.

At 1620, the base station may transmit, to the UE as part of the rate matching configuration, a rate matching indicator for the rate matching resource set and the second rate matching resource set, where the rate matching indicator indicates whether to rate match around the resources of the TTI or rate match into the resources of the TTI for each TTI of the multi-TTI grant. The operations of 1620 may be performed according to the methods described herein. In some examples, aspects of the operations of 1620 may be performed by an indicator component as described with reference to FIGS. 10 through 13.

At 1625, the base station may perform rate matching of a set of data based on the rate matching resource set and the rate matching configuration. The operations of 1625 may be performed according to the methods described herein. In some examples, aspects of the operations of 1625 may be performed by a rate matching component as described with reference to FIGS. 10 through 13.

At 1630, the base station may exchange the rate matched set of data with the UE via the TTI. The operations of 1630 may be performed according to the methods described herein. In some examples, aspects of the operations of 1630 may be performed by a data manager as described with reference to FIGS. 10 through 13.

Figure 17:
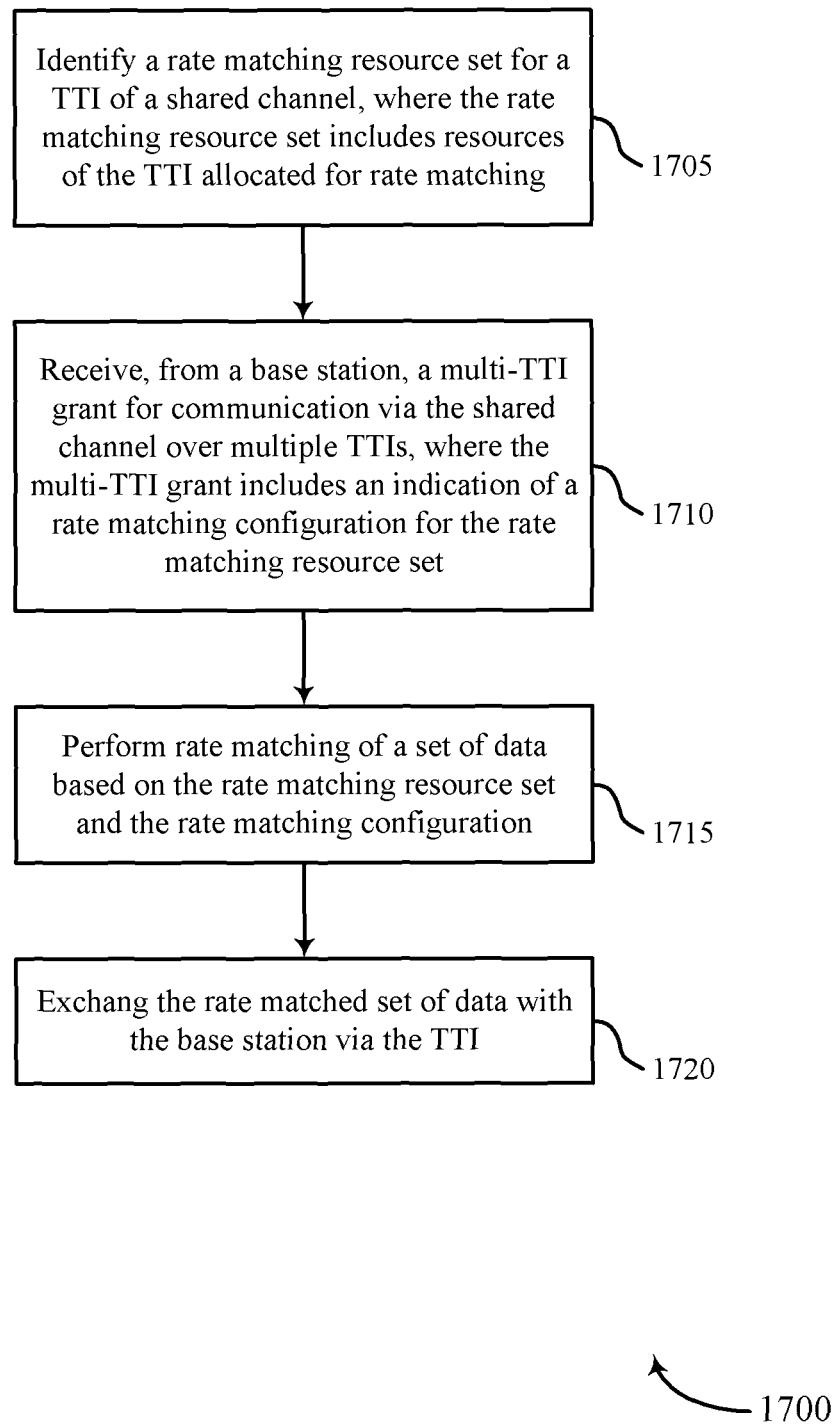

FIG. 17 shows a flowchart illustrating a method 1700 that supports rate matching resource sets for wireless systems in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1705, the UE may identify a rate matching resource set for a TTI of a shared channel, where the rate matching resource set includes resources of the TTI allocated for rate matching. The operations of 1705 may be performed according to the methods described herein. In some examples, aspects of the operations of 1705 may be performed by a resource component as described with reference to FIGS. 6 through 9.

At 1710, the UE may receive, from a base station, a multi-TTI grant for communication via the shared channel over multiple TTIs, where the multi-TTI grant includes an indication of a rate matching configuration for the rate matching resource set. The operations of 1710 may be performed according to the methods described herein. In some examples, aspects of the operations of 1710 may be performed by a grant receiver as described with reference to FIGS. 6 through 9.

At 1715, the UE may perform rate matching of a set of data based on the rate matching resource set and the rate matching configuration. The operations of 1715 may be performed according to the methods described herein. In some examples, aspects of the operations of 1715 may be performed by a rate matching component as described with reference to FIGS. 6 through 9.

At 1720, the UE may exchange the rate matched set of data with the base station via the TTI. The operations of 1720 may be performed according to the methods described herein. In some examples, aspects of the operations of 1720 may be performed by a data component as described with reference to FIGS. 6 through 9.

Figure 18:
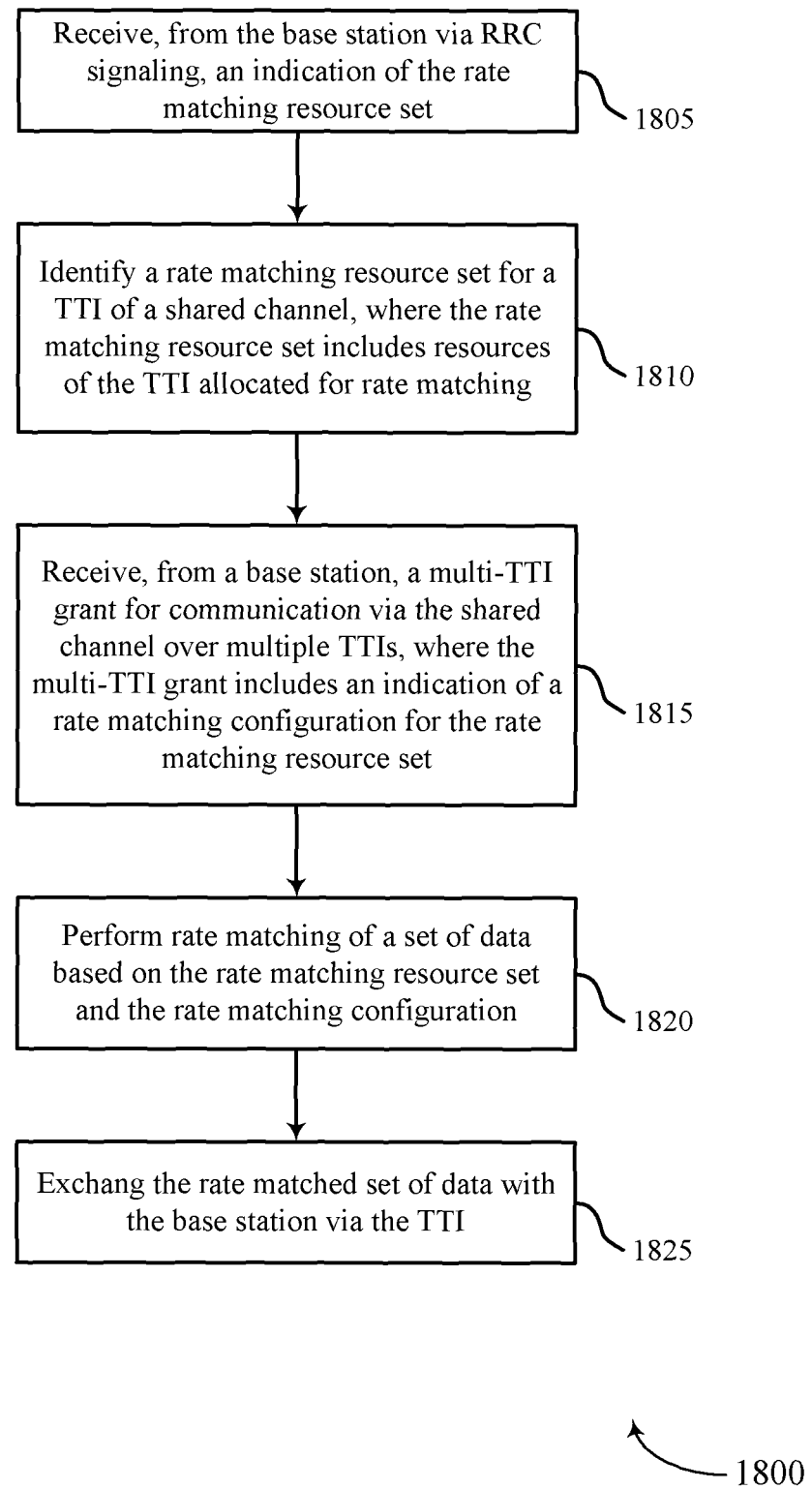

FIG. 18 shows a flowchart illustrating a method 1800 that supports rate matching resource sets for wireless systems in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1805, the UE may receive, from the base station via RRC signaling, an indication of the rate matching resource set. The operations of 1805 may be performed according to the methods described herein. In some examples, aspects of the operations of 1805 may be performed by a resource component as described with reference to FIGS. 6 through 9.

At 1810, the UE may identify a rate matching resource set for a TTI of a shared channel, where the rate matching resource set includes resources of the TTI allocated for rate matching. The operations of 1810 may be performed according to the methods described herein. In some examples, aspects of the operations of 1810 may be performed by a resource component as described with reference to FIGS. 6 through 9.

At 1815, the UE may receive, from a base station, a multi-TTI grant for communication via the shared channel over multiple TTIs, where the multi-TTI grant includes an indication of a rate matching configuration for the rate matching resource set. The operations of 1815 may be performed according to the methods described herein. In some examples, aspects of the operations of 1815 may be performed by a grant receiver as described with reference to FIGS. 6 through 9.

At 1820, the UE may perform rate matching of a set of data based on the rate matching resource set and the rate matching configuration. The operations of 1820 may be performed according to the methods described herein. In some examples, aspects of the operations of 1820 may be performed by a rate matching component as described with reference to FIGS. 6 through 9.

At 1825, the UE may exchange the rate matched set of data with the base station via the TTI. The operations of 1825 may be performed according to the methods described herein. In some examples, aspects of the operations of 1825 may be performed by a data component as described with reference to FIGS. 6 through 9.

Figure 19:
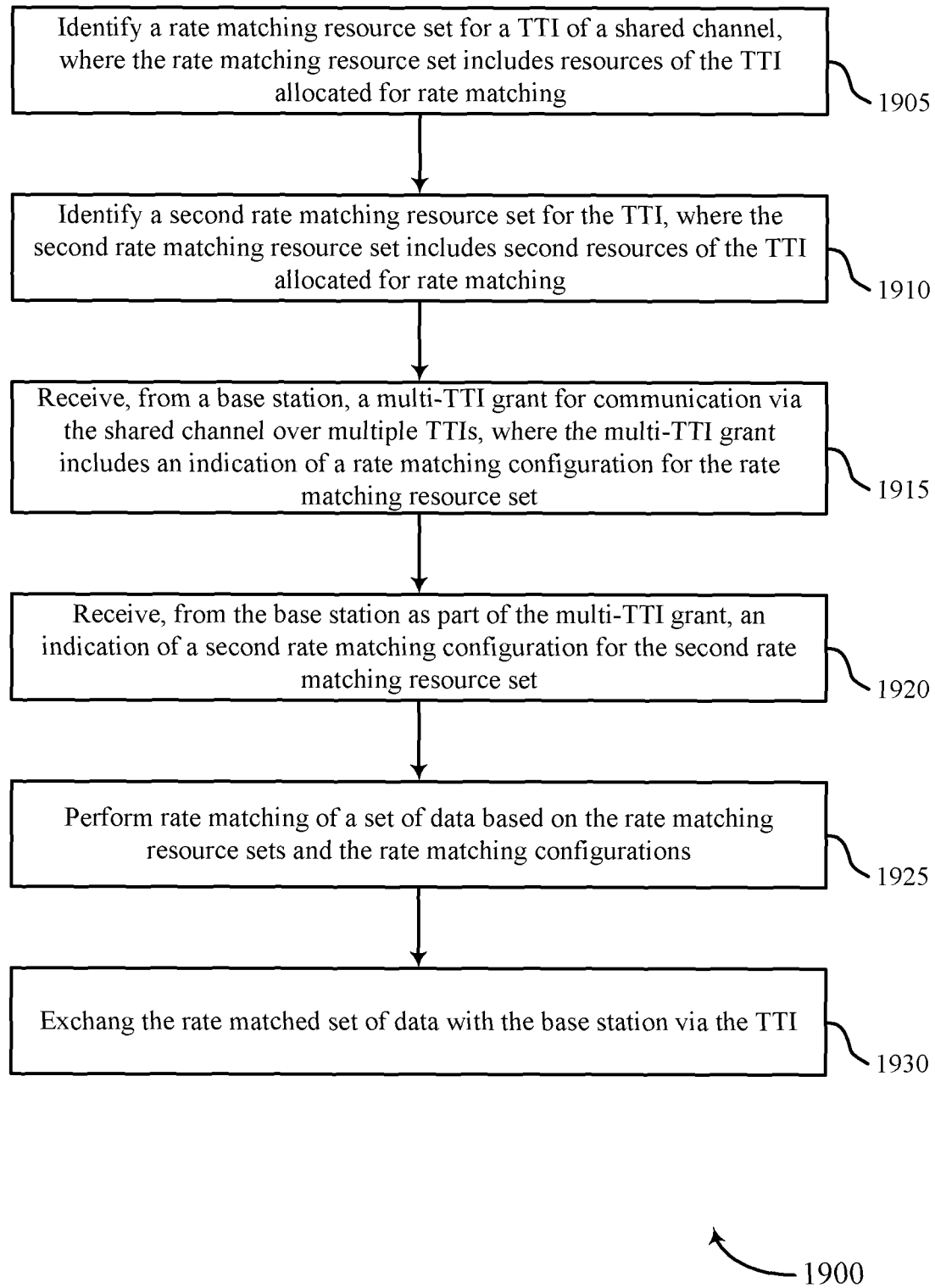

FIG. 19 shows a flowchart illustrating a method 1900 that supports rate matching resource sets for wireless systems in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1905, the UE may identify a rate matching resource set for a TTI of a shared channel, where the rate matching resource set includes resources of the TTI allocated for rate matching. The operations of 1905 may be performed according to the methods described herein. In some examples, aspects of the operations of 1905 may be performed by a resource component as described with reference to FIGS. 6 through 9.

At 1910, the UE may identify a second rate matching resource set for the TTI, where the second rate matching resource set includes second resources of the TTI allocated for rate matching. The operations of 1910 may be performed according to the methods described herein. In some examples, aspects of the operations of 1910 may be performed by a resource component as described with reference to FIGS. 6 through 9.

At 1915, the UE may receive, from a base station, a multi-TTI grant for communication via the shared channel over multiple TTIs, where the multi-TTI grant includes an indication of a rate matching configuration for the rate matching resource set. The operations of 1915 may be performed according to the methods described herein. In some examples, aspects of the operations of 1915 may be performed by a grant receiver as described with reference to FIGS. 6 through 9.

At 1920, the UE may receive, from the base station as part of the multi-TTI grant, an indication of a second rate matching configuration for the second rate matching resource set. The operations of 1920 may be performed according to the methods described herein. In some examples, aspects of the operations of 1920 may be performed by a grant receiver as described with reference to FIGS. 6 through 9.

At 1925, the UE may perform rate matching of a set of data based on the rate matching resource sets and the rate matching configurations. The operations of 1925 may be performed according to the methods described herein. In some examples, aspects of the operations of 1925 may be performed by a rate matching component as described with reference to FIGS. 6 through 9.

At 1930, the UE may exchange the rate matched set of data with the base station via the TTI. The operations of 1930 may be performed according to the methods described herein. In some examples, aspects of the operations of 1930 may be performed by a data component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   determining a rate matching resource set for a transmission time interval (TTI) of a shared channel, wherein the rate matching resource set comprises resources of the TTI allocated for rate matching;
   determining a rate matching configuration for the rate matching resource set;
   transmitting, to a user equipment (UE), a multi-TTI grant for communication via the shared channel over multiple TTIs, wherein the multi-TTI grant comprises an indication of the rate matching configuration for the rate matching resource set;
   transmitting, to the UE, control information comprising an indication of a resource allocation pattern for the multi-TTI grant;
   performing rate matching of a set of data based at least in part on the rate matching resource set and the rate matching configuration; and
   exchanging the rate matched set of data with the UE via the TTI.

2. The method of claim 1, further comprising:
   determining a second rate matching resource set for the TTI, wherein the second rate matching resource set comprises second resources of the TTI allocated for rate matching;
   determining a second rate matching configuration for the second rate matching resource set; and
   transmitting, to the UE as part of the multi-TTI grant, an indication of the second rate matching configuration for the second rate matching resource set.

3. The method of claim 2, wherein:
   the rate matching resource set comprises one or more symbols or resource blocks at a beginning of the TTI; and
   the second rate matching resource set comprises one or more symbols or resource blocks at an end of the TTI.

4. The method of claim 2, further comprising:
   transmitting, to the UE as part of the rate matching configuration, a rate matching indicator for the rate matching resource set and the second rate matching resource set, wherein the rate matching indicator indicates whether to rate match around or rate match into the resources of the TTI for each TTI of the multi-TTI grant.

5. The method of claim 4, wherein transmitting the rate matching indicator comprises:
   transmitting the rate matching indicator for each TTI of the multi-TTI grant, wherein each rate matching indicator comprises a set of two or more bits indicating the rate matching configuration for the rate matching resource set and the second rate matching resource set for each TTI of the multi-TTI grant.

6. The method of claim 1, wherein transmitting the control information further comprises:
transmitting downlink control information (DCI) to the UE, the DCI comprising a start and length indicator value that conveys a starting symbol, an ending symbol, and a number of TTIs for the multi-TTI grant.

7. The method of claim 1, wherein performing rate matching comprises:
performing rate matching of the shared channel based at least in part on the rate matching configuration, wherein rate matching is performed around or into the resources of the TTI configured for a physical random access channel (PRACH), a physical uplink control channel (PUCCH), a physical broadcast channel (PBCH), a synchronization signal, a reference signal, a physical downlink control channel (PDCCH), a clear channel access (CCA) gap, or any combination thereof.

8. The method of claim 1, further comprising:
transmitting, to the UE via radio resource control (RRC) signaling, an indication of the rate matching resource set.

9. The method of claim 1, wherein exchanging the rate matched set of data comprises:
transmitting the rate matched set of data via a physical downlink shared channel (PD SCH).

10. The method of claim 1, wherein exchanging the rate matched set of data comprises:
receiving the rate matched set of data via a physical uplink shared channel (PUSCH).

11. A method for wireless communications, comprising:
identifying a rate matching resource set for a transmission time interval (TTI) of a shared channel, wherein the rate matching resource set comprises resources of the TTI allocated for rate matching;
receiving, from a base station, a multi-TTI grant for communication via the shared channel over multiple TTIs, wherein the multi-TTI grant comprises an indication of a rate matching configuration for the rate matching resource set;
receiving, from the base station, control information comprising an indication of a resource allocation pattern for the multi-TTI grant;
performing rate matching of a set of data based at least in part on the rate matching resource set and the rate matching configuration; and
exchanging the rate matched set of data with the base station via the TTI.

12. The method of claim 11, wherein identifying the rate matching resource set comprises:
determining the rate matching resource set based at least in part on the multi-TTI grant.

13. The method of claim 11, wherein identifying the rate matching resource set comprises:
receiving, from the base station via radio resource control (RRC) signaling, an indication of the rate matching resource set.

14. The method of claim 11, further comprising:
identifying a second rate matching resource set for the TTI, wherein the second rate matching resource set comprises second resources of the TTI allocated for rate matching; and
receiving, from the base station as part of the multi-TTI grant, an indication of a second rate matching configuration for the second rate matching resource set.

15. The method of claim 14, wherein:
the rate matching resource set comprises one or more symbols or resource blocks at a beginning of the TTI; and
the second rate matching resource set comprises one or more symbols or resource blocks at an end of the TTI.

16. The method of claim 14, further comprising:
receiving, from the base station as part of the rate matching configuration, a rate matching indicator for the rate matching resource set and the second rate matching resource set, wherein the rate matching indicator indicates whether to rate match around or rate match into the resources of the TTI for each TTI of the multi-TTI grant.

17. The method of claim 16, wherein receiving the rate matching indicator comprises:
receiving the rate matching indicator for each TTI of the multi-TTI grant, wherein each rate matching indicator comprises a set of two or more bits indicating the rate matching configuration for the rate matching resource set and the second rate matching resource set for each TTI of the multi-TTI grant.

18. The method of claim 11, wherein receiving the control information further comprises:
receiving downlink control information (DCI) from the base station, the DCI comprising a start and length indicator value that conveys a starting symbol, an ending symbol, and a number of TTIs for the multi-TTI grant.

19. The method of claim 18, further comprising:
determining the rate matching resource set based at least in part on the starting symbol, the ending symbol, the number of TTIs for the multi-TTI grant, or a combination thereof.

20. The method of claim 11, wherein performing rate matching comprises:
performing rate matching of the shared channel based at least in part on the rate matching configuration, wherein rate matching is performed around or into the resources of the TTI configured for a physical random access channel (PRACH), a physical uplink control channel (PUCCH), a physical broadcast channel (PBCH), a synchronization signal, a reference signal, a physical downlink control channel (PDCCH), a clear channel access (CCA) gap, or any combination thereof.

21. The method of claim 11, wherein exchanging the rate matched set of data comprises:
receiving the set of data via the TTI rate matched around the PDCCH; and
refraining from monitoring a PDCCH occasion in a subsequent TTI.

22. The method of claim 11, wherein exchanging the rate matched set of data comprises:
receiving the set of data via the TTI rate matched around the PDCCH; and
monitoring a PDCCH occasion in the TTI.

23. The method of claim 11, further comprising:
receiving, from the base station via RRC signaling, the indication of the rate matching resource set.

24. The method of claim 11, wherein exchanging the rate matched set of data comprises:
receiving the rate matched set of data via a physical downlink shared channel (PDSCH).

25. The method of claim 11, wherein exchanging the rate matched set of data comprises:
transmitting the rate matched set of data via a physical uplink shared channel (PUSCH).

26. An apparatus for wireless communications, comprising:
- a processor,
- memory coupled with the processor; and
- instructions stored in the memory and executable by the processor to cause the apparatus to:
  - determine a rate matching resource set for a transmission time interval (TTI) of a shared channel, wherein the rate matching resource set comprises resources of the TTI allocated for rate matching;
  - determine a rate matching configuration for the rate matching resource set;
  - transmit, to a user equipment (UE), a multi-TTI grant for communication via the shared channel over multiple TTIs, wherein the multi-TTI grant comprises an indication of the rate matching configuration for the rate matching resource set;
  - transmit, to the UE, control information comprising an indication of a resource allocation pattern for the multi-TTI grant;
  - perform rate matching of a set of data based at least in part on the rate matching resource set and the rate matching configuration; and
  - exchange the rate matched set of data with the UE via the TTI.

27. The apparatus of claim 26, wherein the instructions are further executable by the processor to cause the apparatus to:
- determine a second rate matching resource set for the TTI, wherein the second rate matching resource set comprises second resources of the TTI allocated for rate matching;
- determine a second rate matching configuration for the second rate matching resource set; and
- transmit, to the UE as part of the multi-TTI grant, an indication of the second rate matching configuration for the second rate matching resource set.

28. The apparatus of claim 27, wherein:
- the rate matching resource set comprises one or more symbols or resource blocks at a beginning of the TTI; and
- the second rate matching resource set comprises one or more symbols or resource blocks at an end of the TTI.

29. The apparatus of claim 27, wherein the instructions are further executable by the processor to cause the apparatus to:
- transmit, to the UE as part of the rate matching configuration, a rate matching indicator for the rate matching resource set and the second rate matching resource set, wherein the rate matching indicator indicates whether to rate match around or rate match into the resources of the TTI for each TTI of the multi-TTI grant.

30. An apparatus for wireless communications, comprising:
- a processor,
- memory coupled with the processor; and
- instructions stored in the memory and executable by the processor to cause the apparatus to:
  - identify a rate matching resource set for a transmission time interval (TTI) of a shared channel, wherein the rate matching resource set comprises resources of the TTI allocated for rate matching;
  - receive, from a base station, a multi-TTI grant for communication via the shared channel over multiple TTIs, wherein the multi-TTI grant comprises an indication of a rate matching configuration for the rate matching resource set;
  - receive, from the base station, control information comprising an indication of a resource allocation pattern for the multi-TTI grant;
  - perform rate matching of a set of data based at least in part on the rate matching resource set and the rate matching configuration; and
  - exchange the rate matched set of data with the base station via the TTI.

* * * * *